United States Patent
Kim et al.

(10) Patent No.: US 12,203,299 B2
(45) Date of Patent: Jan. 21, 2025

(54) DOOR HANDLE ASSEMBLY FOR VEHICLE AND METHOD FOR CONTROLLING THE SAME

(71) Applicant: SL Corporation, Daegu (KR)

(72) Inventors: Dukhyun Kim, Gyeongsan-si (KR); Booseob Kim, Gyeongsan-si (KR); Donghwan Lee, Gyeongsan-si (KR); Changsu Lee, Gyeongsan-si (KR); Hakrae Cho, Gyeongsan-si (KR); Donghyeok Kang, Gyeongsan-si (KR); Myungjoo Seo, Gyeongsan-si (KR); Boguk Seo, Gyeongsan-si (KR); Doyoon Song, Gyeongsan-si (KR); Jinhee Yu, Gyeongsan-si (KR); Jaewoong Hwang, Gyeongsan-si (KR); Cheolmin Hwang, Gyeongsan-si (KR)

(73) Assignee: SL Corporation, Daegu (KR)

( * ) Notice: Subject to any disclaimer, the term of this patent is extended or adjusted under 35 U.S.C. 154(b) by 167 days.

(21) Appl. No.: 18/090,244

(22) Filed: Dec. 28, 2022

(65) Prior Publication Data
US 2023/0203857 A1     Jun. 29, 2023

(30) Foreign Application Priority Data

Dec. 29, 2021 (KR) .................. 10-2021-0191560
Jul. 5, 2022 (KR) .................. 10-2022-0082199

(51) Int. Cl.
  *E05B 85/10* (2014.01)
  *B60Q 1/26* (2006.01)
  *E05B 81/06* (2014.01)

(52) U.S. Cl.
  CPC .......... *E05B 85/107* (2013.01); *B60Q 1/2669* (2013.01); *E05B 81/06* (2013.01)

(58) Field of Classification Search
  CPC .......... E05B 81/00; E05B 81/02; E05B 81/04; E05B 81/06; E05B 85/00; E05B 85/02; E05B 85/10; E05B 85/103; E05B 85/107; B60Q 1/00; B60Q 1/26; B60Q 1/2669
  USPC .......................................... 70/208
  See application file for complete search history.

(56) References Cited

U.S. PATENT DOCUMENTS

| | | | | |
|---|---|---|---|---|
| 2017/0292297 A1* | 10/2017 | Bartels | .............. | E05B 85/107 |
| 2018/0201184 A1* | 7/2018 | Lay | .............. | F21S 43/245 |
| 2019/0277071 A1* | 9/2019 | Sabatini | .............. | B60J 5/0468 |
| 2019/0390488 A1* | 12/2019 | Salter | .............. | E05B 85/103 |
| 2020/0181940 A1* | 6/2020 | Fujiwara | .............. | E05B 7/00 |

* cited by examiner

*Primary Examiner* — Nathan Cumar
(74) *Attorney, Agent, or Firm* — United One Law Group LLC; Kongsik Kim; Jhongwoo Peck

(57) ABSTRACT

A door handle assembly for a vehicle may include a door handle, a handle housing configured to provide an accommodation space for the door handle, a drive lever rotatably coupled to the handle housing and rotatably coupled to the door handle, and an actuator configured to transmit a driving force to the drive lever to deploy the door handle from the handle housing. In particular, the door handle is deployed from the handle housing as the drive lever is rotated with respect to the handle housing by the driving force of the actuator, and the door handle is rotated with respect to the drive lever.

18 Claims, 28 Drawing Sheets

DOOR HANDLE ASSEMBLY FOR VEHICLE AND METHOD FOR CONTROLLING THE SAME

CROSS-REFERENCE TO RELATED APPLICATION

This application claims priority from Korean Patent Application No. 10-2021-0191560 filed on Dec. 29, 2021 and Korean Patent Application No. 10-2022-0082199 filed on Jul. 5, 2022, which are incorporated herein by reference in their entireties.

BACKGROUND

1. Technical Field

The present disclosure relates to a door handle assembly for a vehicle and a method for controlling the same, and more particularly, to a door handle assembly for a vehicle with a door handle that is deployable from a door of the vehicle and a method for controlling the same.

2. Description of the Related Art

A door of a vehicle is provided with a door handle capable of opening and closing the door. A user can open or close the door using the door handle. For example, the user can open and close the door by horizontally moving the door handle in one direction or rotating it about a rotating axis.

Meanwhile, when the door handle protrudes from the door of the vehicle, noise may occur, and fuel efficiency may be decreased due to the resistance of air.

Therefore, the problems due to the door handles that protrude from the door of the vehicle need to be solved.

SUMMARY

Aspects of the present disclosure provide a door handle assembly for a vehicle with a door handle that is deployable from a door of the vehicle and a method for controlling the same.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

A door handle assembly for a vehicle according to an embodiment of the present disclosure may include a door handle; a handle housing configured to provide an accommodation space for the door handle; a drive lever rotatably coupled to the handle housing and rotatably coupled to the door handle; an actuator configured to transmit a driving force to the drive lever to deploy the door handle from the handle housing. In particular, the door handle may be deployed from the handle housing as the drive lever is rotated with respect to the handle housing by the driving force of the actuator, and the door handle is rotated with respect to the drive lever.

During a period when the door handle is accommodated in the handle housing, the door handle may be disposed parallel to a vehicle door. During deployment by the driving force of the actuator, the door handle may become inclined with respect to the vehicle door and then be disposed parallel with the vehicle door upon completion of the deployment. As the door handle is disposed inclined with respect to the vehicle door, a part of the door handle may be discharged to exterior of the handle housing.

The door handle assembly may further include a first elastic member configured to generate an elastic force between the handle housing and the drive lever; and a second elastic member configured to generate an elastic force between the drive lever and the door handle. In response to the driving force of the actuator being removed, the door handle may be accommodated in the handle housing by the elastic force of the first elastic member, and in response to the drive lever being rotated by the driving force of the actuator, the door handle may be rotated with respect to the drive lever by the elastic force of the second elastic member.

A vehicle door may be unlocked in response to a force being exerted on the door handle in a direction away from the handle housing in a state where the door handle is deployed from the handle housing.

The door handle assembly may further include an unlocking unit connected to the drive lever and configured to unlock the vehicle door based on the rotation of the drive lever.

The actuator may include a drive motor configured to generate the driving force by rotation; an output shaft configured to move axially by the driving force and press the drive lever; an actuator housing configured to accommodate the drive motor and the output shaft; and a position provision unit configured to provide a position of the output shaft with respect to the actuator housing.

Further, the position provision unit may include a common electrode pin; a first position electrode pin configured to indicate that the output shaft is in a position that does not press the drive lever in response to the first position electrode pin being electrically connected to the common electrode pin; a second position electrode pin configured to indicate that the output shaft is in a position that presses the driving lever in response to the second position electrode pin being electrically connected to the common electrode pin; and a connection pin included in the output shaft and configured to connect the first position electrode pin or the second position electrode pin to the common electrode pin.

The door handle may include a signal receiver configured to receive a signal associated with the deployment of the door handle; a weight body; and a handle body configured to accommodate the signal receiver on one side thereof and the weight body on the other side thereof with respect to a rotation axis of the drive lever. The weight body may be provided to decrease a moment of inertia of the door handle with respect to the rotation axis.

The door handle assembly may further include a support rod configured to move horizontally with respect to the drive lever and support an end of the door handle; and a link configured to move the support rod while rotating with respect to the handle housing by the rotation of the drive lever. As such, in response to a force being exerted on the door handle in a direction away from the handle housing in a state where the door handle is supported by the support rod, the door handle may be prevented from rotating with respect to the driving lever, and the force to the door handle may be transmitted to the drive lever.

In response to a force being exerted on one side of the door handle, a part of the door handle may be deployed from the handle housing as the door handle is rotated with respect to the drive lever.

A door handle assembly for a vehicle according to another embodiment of the present disclosure may include a door handle; a handle housing configured to provide an accommodation space for the door handle; a drive lever rotatably coupled to the handle housing and rotatably coupled to the door handle; an actuator configured to transmit a driving force to the drive lever to deploy the door handle from the handle housing. In particular, the door handle may be deployed from the handle housing as the drive lever is rotated with respect to the handle housing by the driving force of the actuator, and the door handle is rotated with respect to the drive lever. Further, the door handle may include an optical device configured to emit light that corresponds to a vehicle signal received from the vehicle.

A vehicle door may be unlocked in response to a force being exerted on the door handle in a direction away from the handle housing in a state where the door handle is deployed from the handle housing.

The door handle may further include a handle body configured to accommodate the optical device; and a handle cover coupled to the handle body and configured to provide an accommodation space for the optical device. The handle cover may include at least one light emission portion to emit the light generated from the optical device.

Further, the optical device may include a light source configured to irradiate the light; a light guide configured to guide the light irradiated from the light source and emit the light to the handle cover; a substrate configured to support the light source; and a controller configured to control an operation of the light source.

The optical guide may include a light incident part configured to receive the light from the light source, and a light emission part configured to emit the light incident on the light incident part. The light emission part may include a light emission surface disposed towards the handle cover and configured to emit the light incident on the light incident part to the handle cover; and a light diffusion surface provided on an opposite side of the light emission surface and configured to diffuse the light incident on the light incident part to the light emission surface. In particular, the light diffusion surface may include at least one light diffusion part formed by recessing the light diffusion surface inwards.

The controller may be configured to control the light source to irradiate the light of a particular color or pattern depending on the vehicle signal received from the vehicle.

Door handle assemblies for a vehicle according to embodiments of the present disclosure as described herein can prevent resistance (e.g., drag) caused by air during driving since the door handle can be embedded (e.g., retracted, withdrawn) or deployed in the door of the vehicle. In addition, since the entire door handle is deployed in the door of the vehicle, the user can more easily operate the door handle. Further, since the door handle emits light in response to different situations, the user can more easily recognize the situations.

BRIEF DESCRIPTION OF THE DRAWINGS

The above and other aspects and features of the present disclosure will become more apparent by describing in detail exemplary embodiments thereof with reference to the appended drawings, in which.

DETAILED DESCRIPTION

Figure 1:
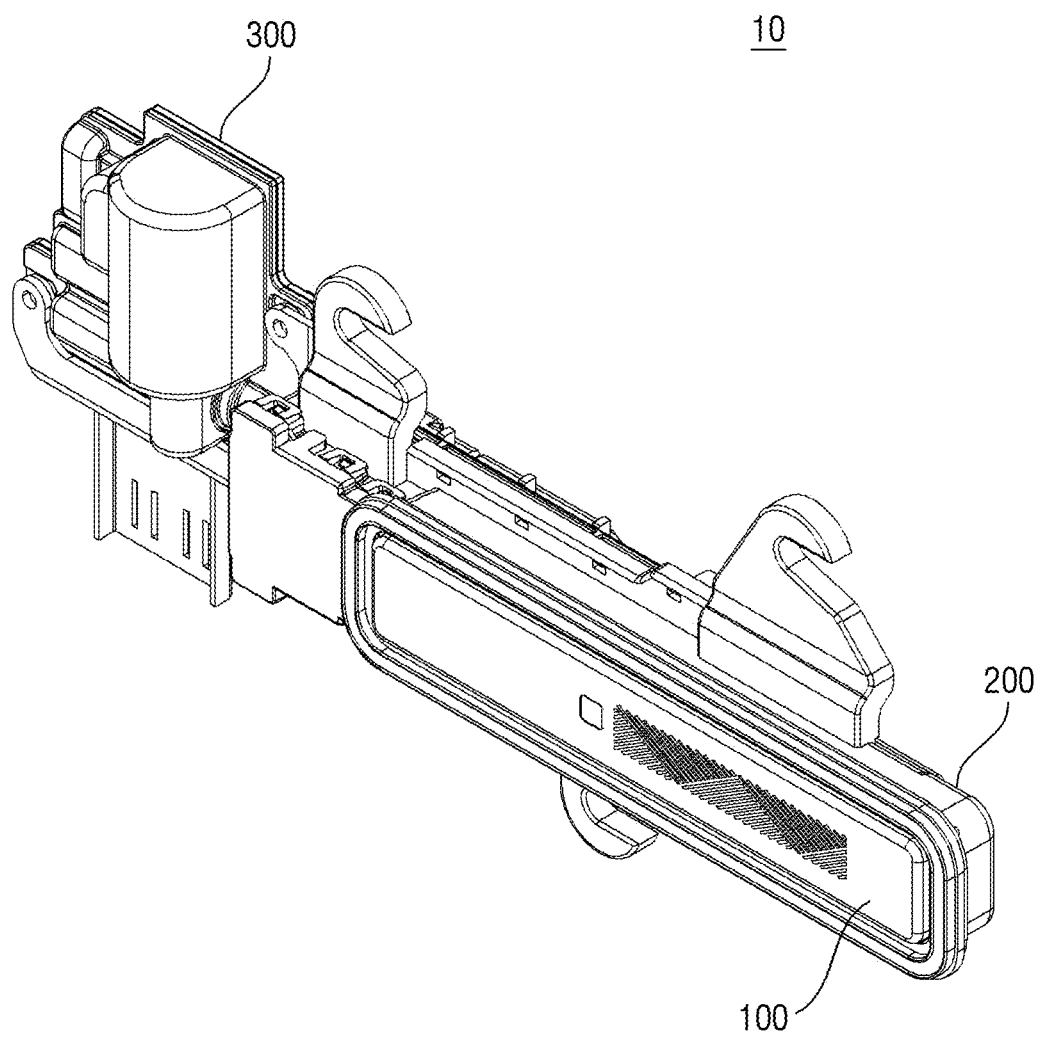
FIG. 1 is a perspective view of a door handle assembly for a vehicle according to an embodiment of the present disclosure.

Hereinafter, embodiments of the present disclosure will be described with reference to the attached drawings. Advantages and features of the present disclosure, and a method of achieving them will be apparent with reference to the embodiments described below in detail together with the accompanying drawings. However, the present disclosure is not limited to the embodiments to be described below, but may be implemented in various different forms, and these embodiments are only provided to make the disclosures complete, and to fully inform the scope of the disclosure to those of ordinary skill in the technical field to which the present disclosure belongs. The disclosure is only defined by the scope of the claims. The same reference numerals refer to the same components throughout the specification.

Unless otherwise defined, all terms (including technical and scientific terms) used in the present specification may be used as meanings that can be commonly understood by those of ordinary skill in the art to which the present disclosure belongs. In addition, terms defined in a commonly used dictionary are not to be interpreted too ideally or excessively unless explicitly defined specifically.

Figure 2:
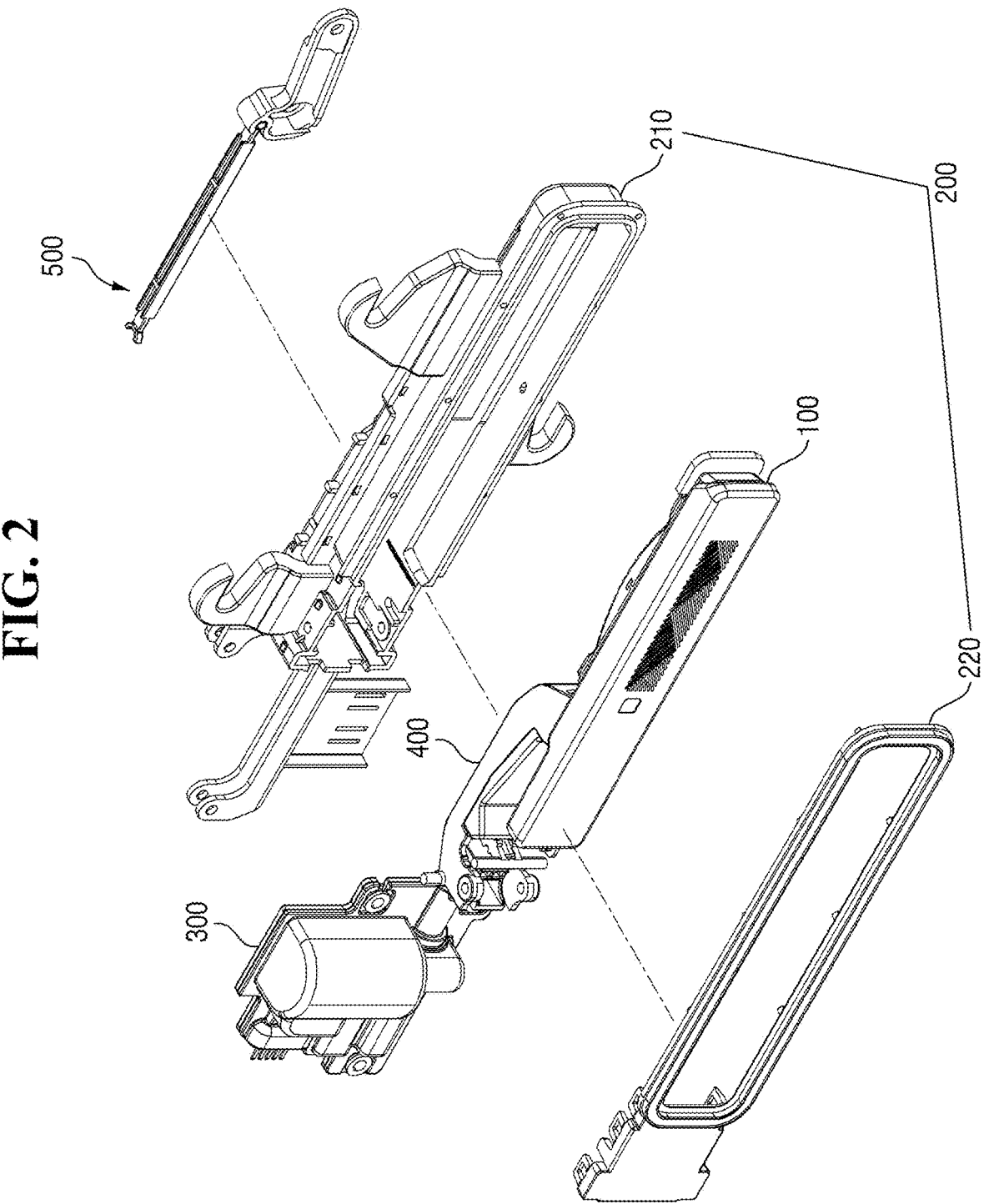
FIG. 2 is an exploded perspective view of the door handle assembly for a vehicle according to an embodiment of the present disclosure.

FIG. 1 is a perspective view of a door handle assembly for a vehicle according to an embodiment of the present disclosure, and FIG. 2 is an exploded perspective view of the door handle assembly for a vehicle according to an embodiment of the present disclosure. Referring to FIGS. 1 and 2, a door handle assembly 10 for a vehicle according to an embodiment of the present disclosure may include a door handle 100, a handle housing 200, a drive lever 400, an actuator 300, and an unlocking unit 500.

The door handle 100 may be grasped by a user and may be used to open a door of a vehicle. For example, the user may open the door of the vehicle (hereinafter referred to as "a vehicle door") by pulling the door handle 100 towards the outside of the vehicle.

Furthermore, the door handle 100 may emit light that corresponds to a signal received from the vehicle (e.g., a controller in the vehicle). Accordingly, the door handle 100 may be used not only to open the vehicle door, but also to emit light that allows the user to notice the status of the vehicle.

The handle housing 200 may provide an accommodation space of the door handle 100. In the present disclosure, the door handle 100 may be in a state of being accommodated in the handle housing 200 or in a state of being deployed therefrom, i.e., in a state of being discharged from the handle housing 200. The handle housing 200 may be fixedly coupled to the vehicle door. When the door handle 100 is accommodated in the handle housing 200, the door handle 100 may be retracted (e.g., withdrawn) within the vehicle door. Meanwhile, when the door handle 100 is deployed from the handle housing 200, the door handle 100 may protrude from the exterior surface of the vehicle door. The user may open the vehicle door by pulling the door handle 100 that protrudes from the vehicle door.

The handle housing 200 may include a housing body 210 and a housing cover 220. The housing body 210 may be fixedly coupled to the vehicle door to provide an accommodation space of the door handle 100. The housing cover 220 may be coupled to the housing body 210 to provide an entry port through which the door handle 100 is accommodated in the housing body 210 or deployed therefrom.

In addition, the housing cover 220 may seal at least a part of an opening of the housing body 210. For example, the housing cover 220 may seal the remainder of the opening of the housing body 210, except the space for moving the door handle 100. Accordingly, external substances can be prevented from being introduced into the housing body 210, and the components accommodated into the housing body 210 can be prevented from being observed from the outside.

The drive lever 400 may be rotatably coupled to the handle housing 200 and the door handle 100. The door handle 100 may be inserted into the handle housing 200 or deployed from the handle housing 200 as the drive lever 400 rotates with respect to the handle housing 200. In the present disclosure, the door handle 100 may be disposed substantially parallel with the vehicle door both in the state where it is accommodated in the handle housing 200 (hereinafter referred to as "an accommodated state") and in the state where it is deployed from the handle housing 200 (hereinafter referred to as "a deployed state"). For example, in the accommodated state and the deployed state, the door handle 100 may have a posture parallel to the vehicle door. More specifically, in the accommodated state, the door handle 100 may be buried in the vehicle door and have a posture parallel to the vehicle door, and in the deployed state, the door handle 100 may protrude from the vehicle door and have a posture parallel to the vehicle door. In addition, during the accommodation operation or the deployment operation, the door handle 100 may temporarily have an inclined posture. For example, the door handle 100 may have a posture parallel to the vehicle door in the accommodated state, a posture inclined with respect to the vehicle door during the deployment, and a posture parallel to the vehicle door again when the deployment is completed.

The door handle 100 may be rotatably coupled to the drive lever 400 so that the door handle 100 may have a posture parallel to the vehicle door in both the accommodated state and the deployed state. The door handle 100 may rotate with respect to the drive lever 400 while the drive lever 400 rotates with respect to the handle housing 200, thus determining the posture of the door handle 100 for the vehicle door.

The actuator 300 may deploy the door handle 100 from the handle housing 200 by transmitting a driving force to the drive lever 400. As described above, the drive lever 400 may rotate with respect to the handle housing 200, so that the door handle 100 may be inserted into the handle housing 200, or the door handle 100 may be deployed from the handle housing 200. When the actuator 300 transmits the driving force to the drive lever 400, the drive lever 400 may rotate with respect to the handle housing 200, and the door handle 100 may be simultaneously deployed from the handle housing 200.

As the drive lever 400 rotates with respect to the handle housing 200 by the driving force of the actuator 300 and the door handle 100 rotates with respect to the drive lever 400, the entire door handle 100 may be deployed from the handling housing 200. When the door handle 100 is deployed from or accommodated in the handle housing 200, the door handle 100 may have the posture parallel to the vehicle door following the temporarily inclined posture to the vehicle door. In the accommodated state, the door handle 100 may have the posture parallel to the vehicle door and may have the posture inclined to the vehicle door while being deployed from the handle housing 200, and when the deployment is completed, the door handle 100 may have the posture parallel to the vehicle door again. Likewise, in the deployed state, the door handle 100 may have the posture parallel to the vehicle door and may have the posture inclined to the vehicle door while being accommodated into the handle housing 200, and when the accommodation is completed, the door handle 100 may have the posture parallel to the vehicle door again.

The unlocking unit 500 may be connected to the drive lever 400 and may operate by rotation of the drive lever 400 and unlock the vehicle door. A detailed description of the structure and function of the unlocking unit 500 will be provided below with reference to FIGS. 8 and 9.

Figure 3:
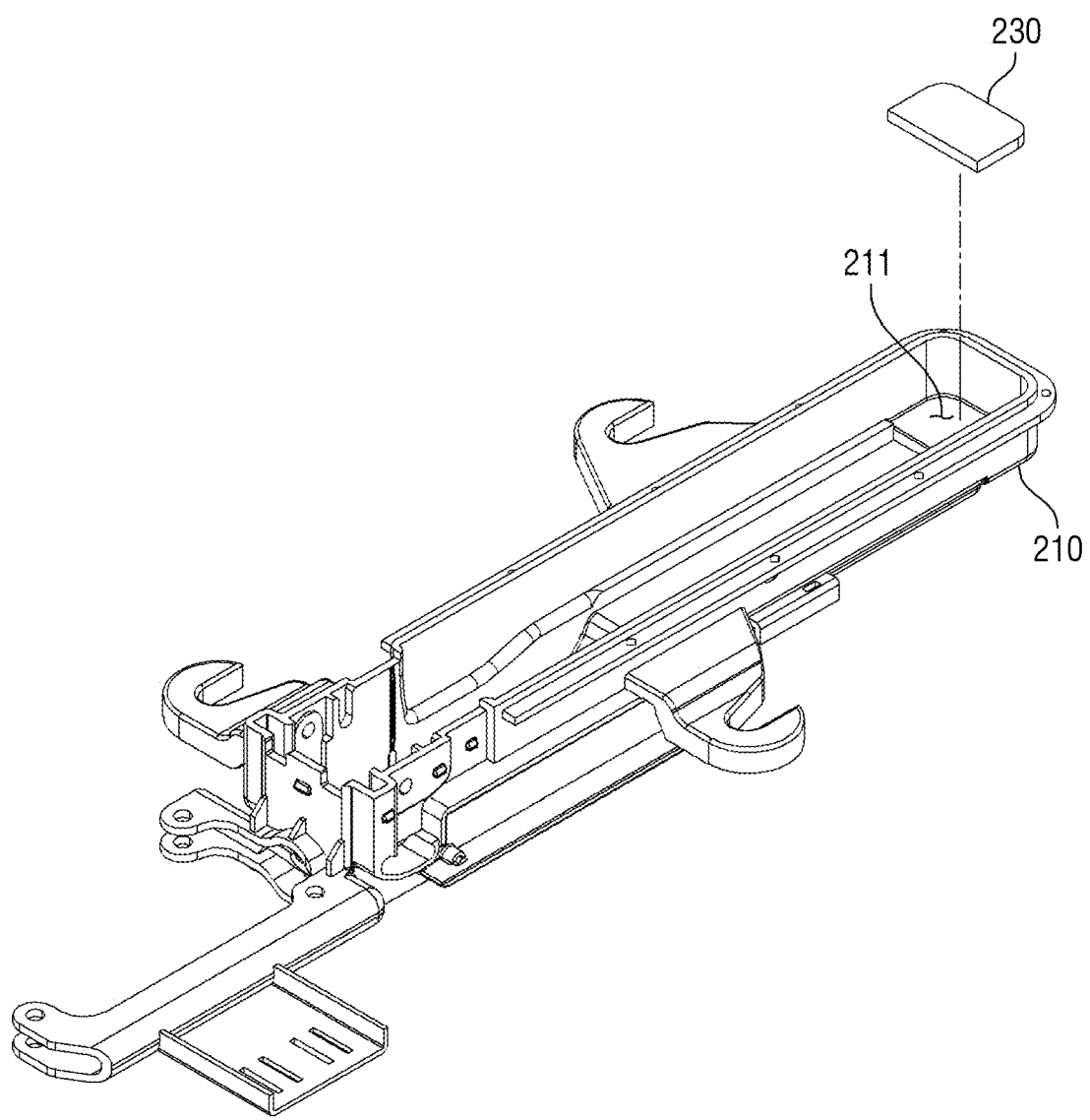
FIG. 3 illustrates a buffer provided in a housing body.

FIG. 3 depicts a buffer provided in the housing body. Referring to FIG. 3, a housing body 210 may include a buffer 230. The buffer 230 may be provided in the handle housing 200 to buffer or absorb the impact between the door handle 100 and the handle housing 200. The housing body 210 may include an accommodating groove 211 for arranging a buffer 230. The buffer 230 may be accommodated in the accommodating groove 211 to alleviate (e.g., buffer or absorb) the impact between the housing body 210 and at least one of the door handle 100 or the drive lever 400.

FIG. 3 illustrates an example where one buffer member 230 is provided in the housing body 210. However, the present disclosure is not limited to such a configuration, and a plurality of buffers 230 may be provided in the housing body 210.

Figure 4:
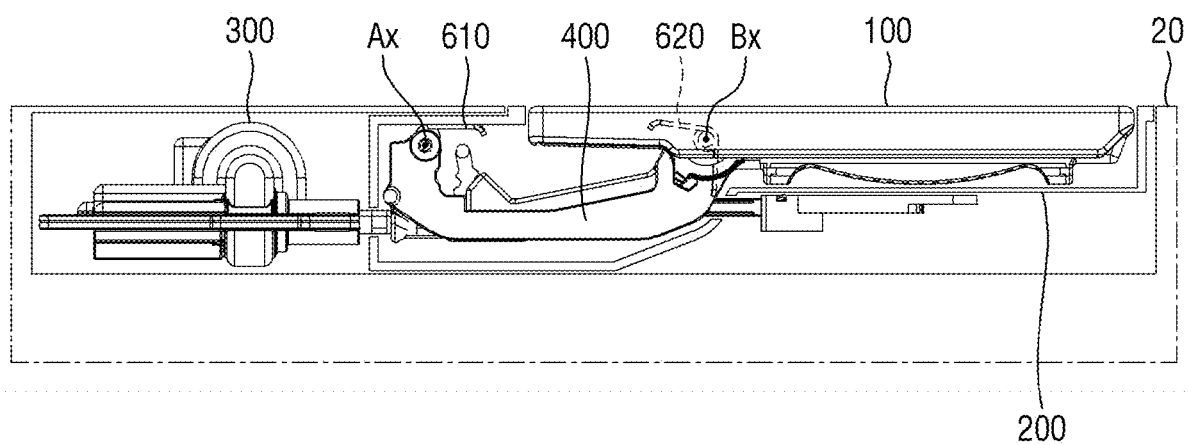
FIG. 4 illustrates the door handle accommodated in the handle housing.
Figure 5:
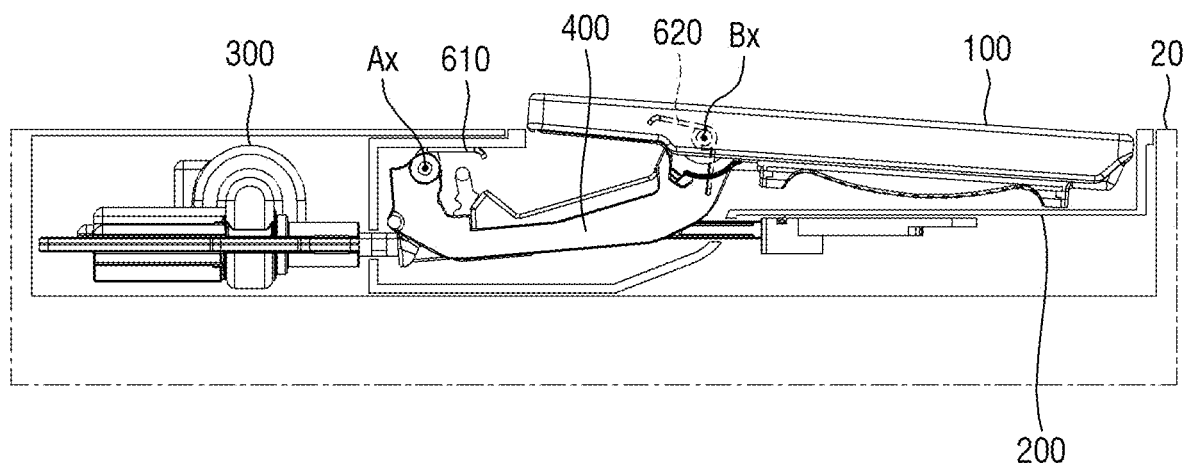
FIG. 5 illustrates the door handle being deployed from the handle housing.
Figure 6:
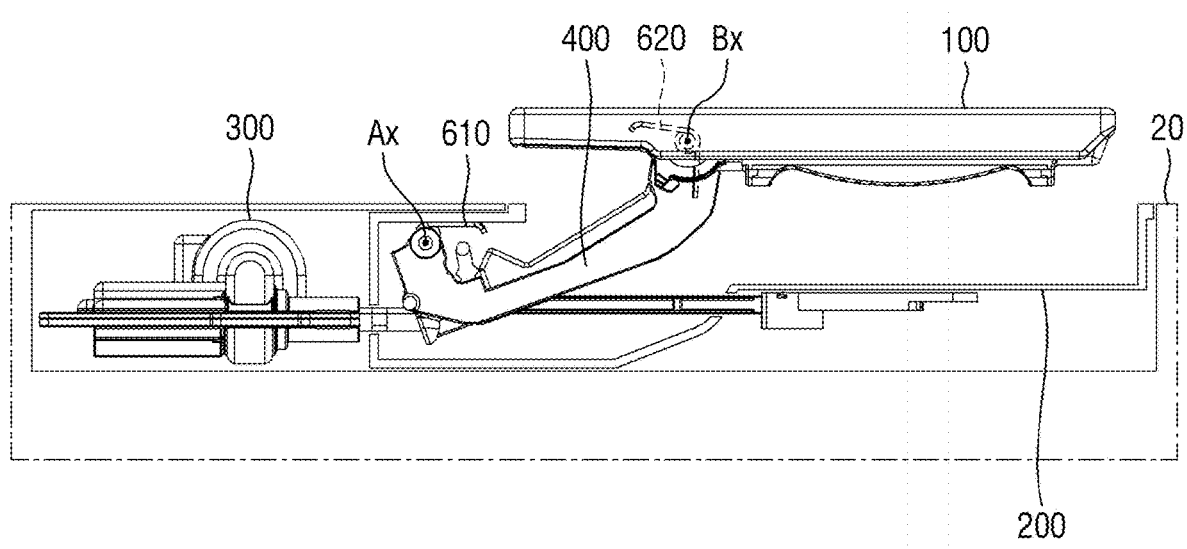
FIG. 6 illustrates the entire door handle deployed from the handle housing.
Figure 7:
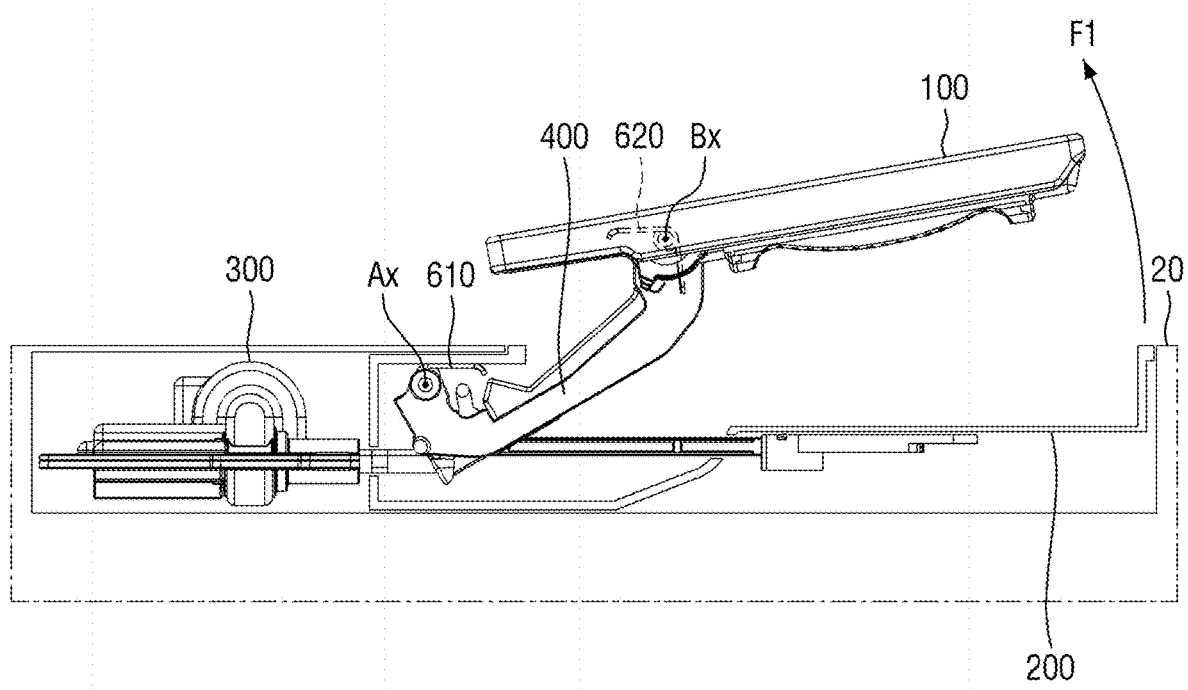
FIG. 7 illustrates a force for unlocking the vehicle door exerted on the door handle.
Figure 8:
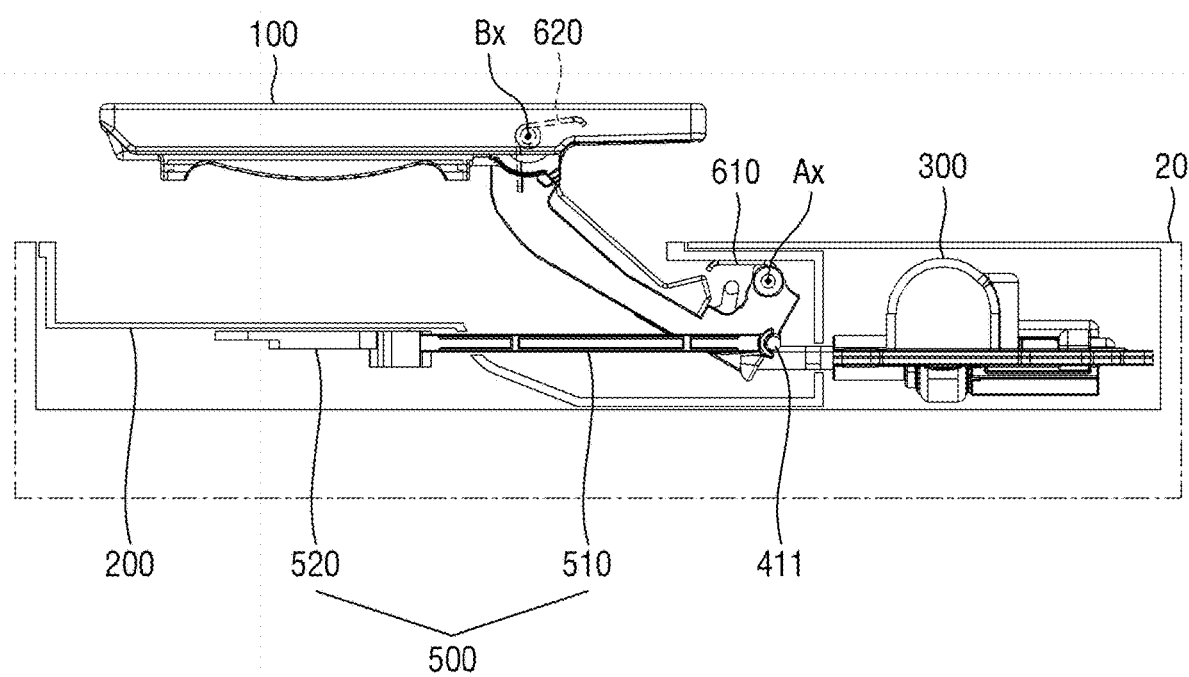
FIG. 8 depicts the coupling relationship between the drive lever and the unlocking unit.
Figure 9:
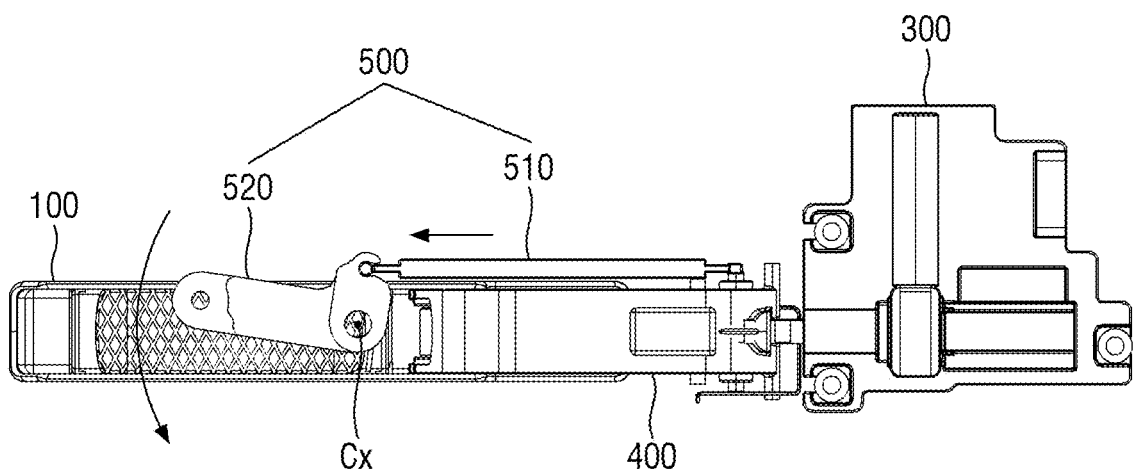
FIG. 9 depicts an operation of the unlocking unit.

FIG. 4 illustrates the door handle accommodated in the handle housing, FIG. 5 illustrates the door handle being deployed from the handle housing, and FIG. 6 illustrates the entire door handle deployed from the handle housing. Further, FIG. 7 depicts a force unlocking the vehicle door being exerted on the door handle, FIG. 8 depicts the coupling relation between the drive lever and the unlocking unit, and FIG. 9 depicts an operation of the unlocking unit.

Referring to FIGS. 4 to 6, the door handle 100 may be deployed from the handle housing 200 as the drive lever 400 rotates with respect to the handle housing 200. As illustrated in FIG. 4, the door handle 100 may have the posture parallel to a vehicle door 20 while being accommodated in the handle housing 200. In such case, the door handle 100 may be disposed in the handle housing 200 such that an outer surface of the door handle 100 and an outer surface of the door are disposed on a substantially same plane (e.g., "flush" with each other).

The drive lever 400 may include a first elastic member 610. The first elastic member 610 may generate an elastic force between the handle housing 200 and the drive lever 400. The first elastic member 610 may generate an elastic force that biases the door handle 100 toward being inserted into the handle housing 200. The elastic force of the first elastic member 610 may act as a rotational force that rotates the drive lever 400 with respect to the handle housing 200, and upon removing the driving force of the actuator 300, the door handle 100 may be accommodated in the handle housing 200 by the elastic force of the first elastic member 610, as illustrated in FIG. 4.

As illustrated in FIGS. 5 and 6, the door handle 100 may be deployed from the handle housing 200 while the drive lever 400 rotates with respect to the handle housing 200 by the driving force of the actuator 300. When the driving force of the actuator 300 exceeds the elastic force of the first elastic member 610 that resists the rotation, the drive lever 400 may rotate with respect to the handle housing 200 about a first rotation axis Ax. As the drive lever 400 rotates, the door handle 100 may be deployed from the handle housing 200.

A second elastic member 620 may be provided between the drive lever 400 and the door handle 100. The second elastic member 620 may generate an elastic force between the drive lever 400 and the door handle 100. The elastic force of the second elastic member 620 may bias the door handle 100 to be rotated toward one direction with respect to the drive lever 400.

When the drive lever 400 rotates by the driving force of the actuator 300, the door handle 100 may rotate with respect to the drive lever 400 about a second rotation axis Bx by the elastic force of the second elastic member 620. As illustrated in FIG. 5, the drive lever 400 may rotate with respect to the handle housing 200 by the driving force of the actuator 300, and the door handle 100 may simultaneously rotate with respect to the drive lever 400 such that the door handle 100 has the posture inclined with respect to the vehicle door 20. When the door handle 100 has the position inclined to the vehicle door 20, a part of the door handle 100 may be discharged to the outside of the handle housing 200.

The rotation of the door handle 100 with respect to the drive lever 400 may be continued up to a predetermined angle, and as illustrated in FIG. 6, the predetermined angle may be selected as an angle at which the door handle 100 becomes parallel to the door when the rotation of the drive lever 400 with respect to the handle housing 200 is completed.

When only a part of the door handle 100 is deployed from the handle housing 200, the door handle 100 may not be easily grasped by the user. As illustrated in FIG. 6, conversely, with the deployment of the entire door handle 100 from the handle housing 200, the user can more easily grasp the door handle 100.

Referring to FIG. 7, when a force F1 is exerted on the door handle 100 in a direction away from the handle housing 200 in a state where the entire door handle 100 is deployed from the handle housing 200, the vehicle door 20 may be unlocked. The user may pull the door handle 100 in a state where the entire door handle 100 is deployed from the handle housing 200. In response, the vehicle door 20 may be unlocked while the drive lever 400 rotates together with the door handle 100. With the unlocking of the vehicle door 20, the vehicle door 20 may be opened.

Referring to FIGS. 8 and 9, when the door handle 100 is deployed from the handle housing 200, an unlocking pin 411 of the drive lever 400 may abut the unlocking unit 500. When the user pulls the door handle 100 in a state where the door handle 100 is deployed from the handle housing 200, the drive lever 400 may rotate with respect to the handle housing 200. With the rotation of the drive lever 400, the unlocking pin 411 may press (or slide) the unlocking unit 500.

The unlocking unit 500 may include a release rod 510 and a release lever 520. The release rod 510 may be in contact with the unlocking pin 411 and may be configured to move with respect to the handle housing 200 when the unlocking pin 411 presses the unlocking unit 500. The release lever 520 may be provided in an end of the release rod 510. The release lever 520 may be rotatably coupled to the handle housing 200. The release lever 520 may rotate with respect to the handle housing 200 about a third rotation axis Cx. When the release rod 510 is moved by the unlocking pin 411, the release lever 520 may rotate with respect to the handle housing 200. The release lever 520 may be connected to a locking means of the vehicle door 20, and with the rotation of the release lever 520, the vehicle door 20 may be unlocked.

Figure 10:
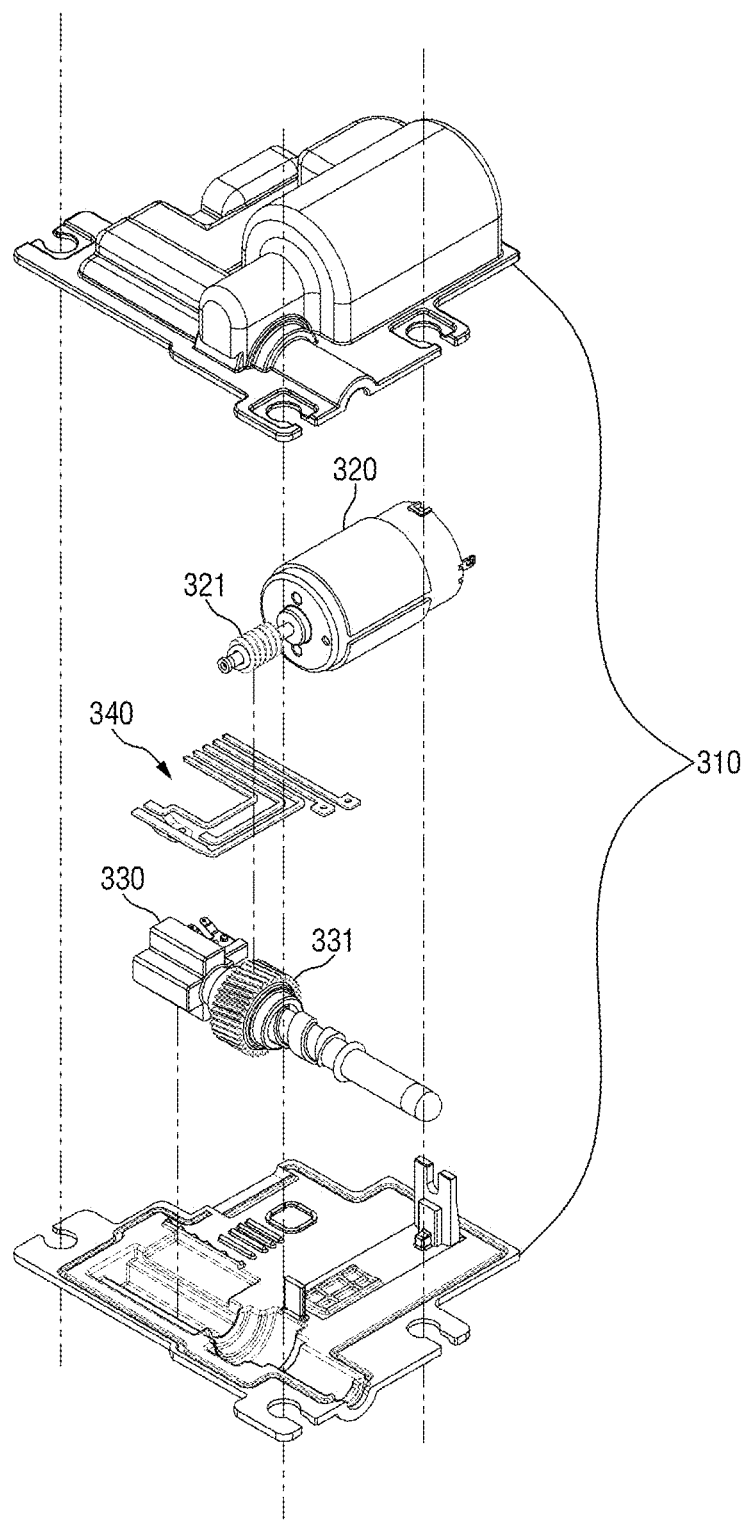
FIG. 10 is an exploded perspective view of an actuator.
Figure 11:
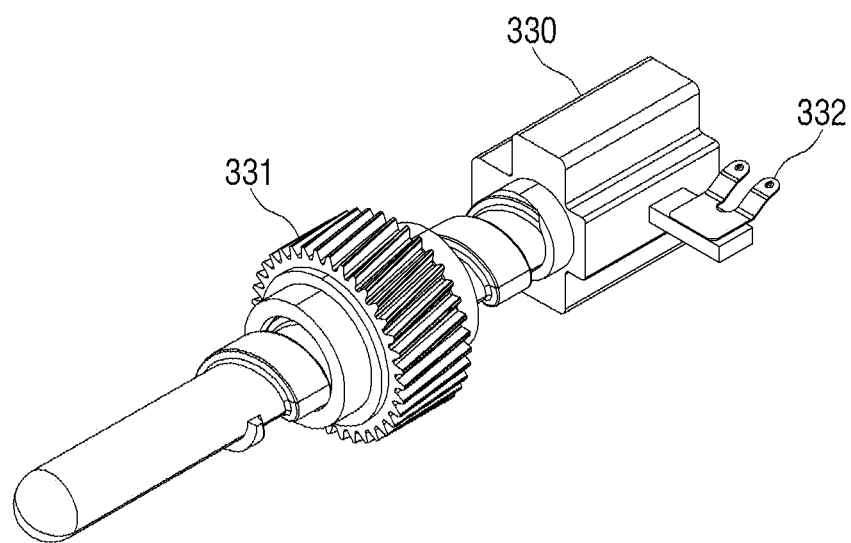
FIG. 11 illustrates an output shaft.
Figure 12:
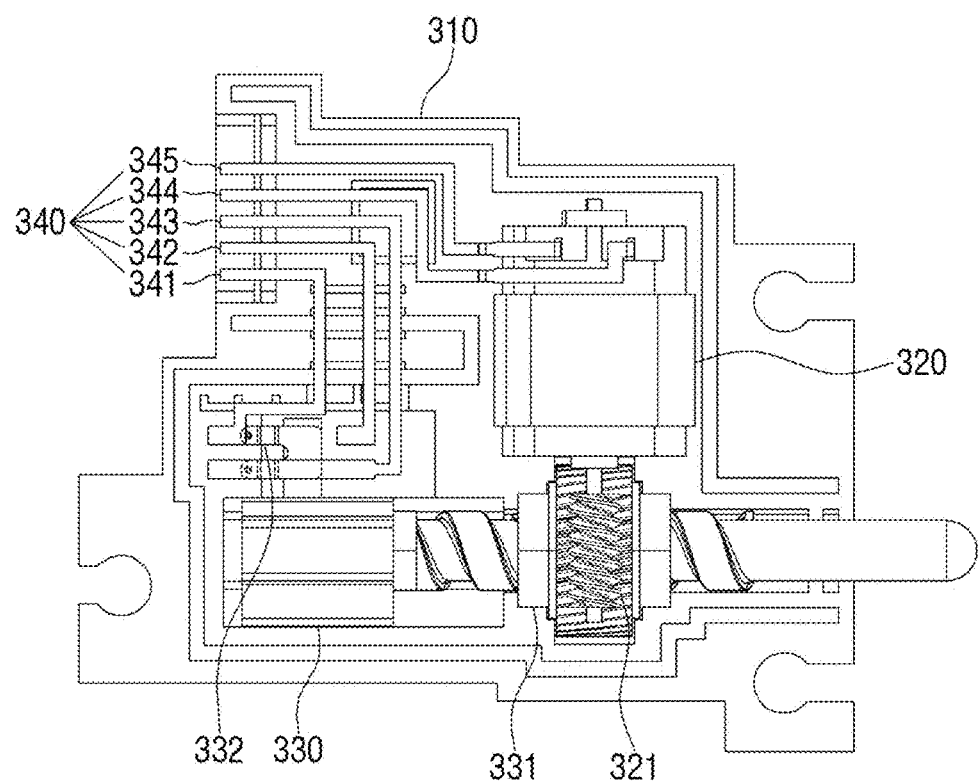
FIG. 12 is a view illustrating that a common electrode pin and a first position electrode pin are electrically connected.
Figure 13:
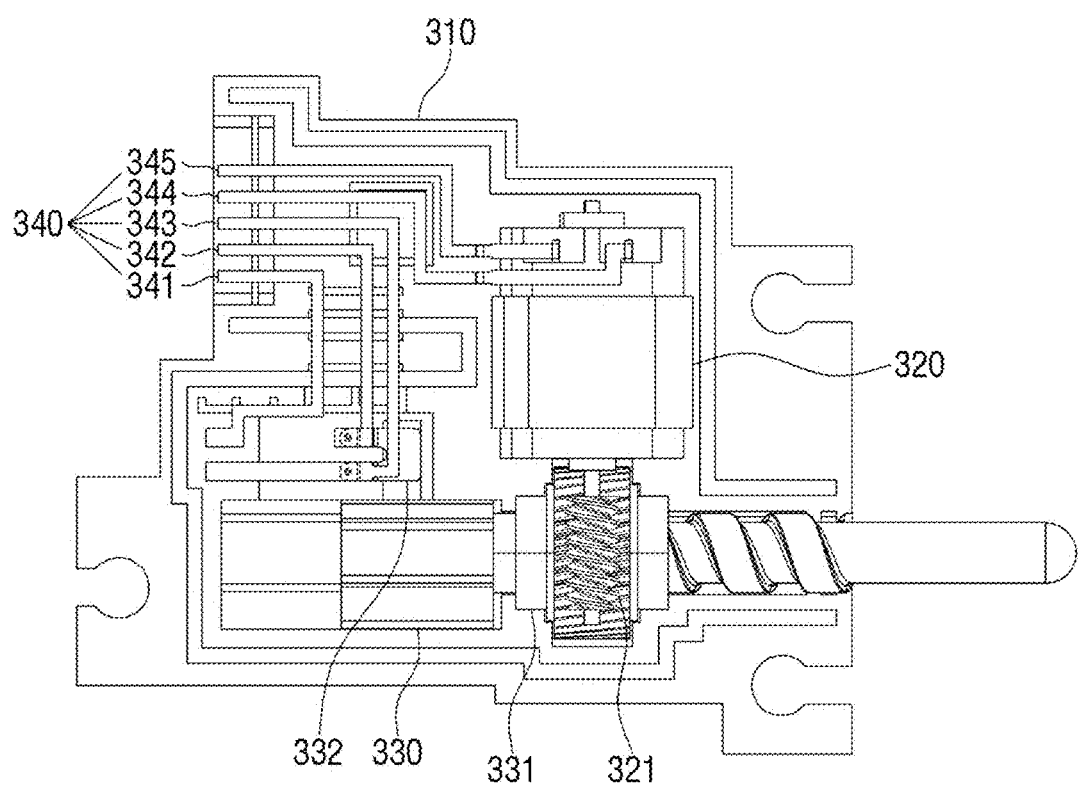
FIG. 13 is a view illustrating that the common electrode pin and a second position electrode pin are electrically connected.

FIG. 10 is an exploded perspective view of an actuator, FIG. 11 illustrates an output shaft, FIG. 12 is a view illustrating that a common electrode pin and a first position electrode pin are electrically connected, and FIG. 13 is a view illustrating that the common electrode pin and a second position electrode pin are electrically connected.

Referring to FIG. 10, the actuator 300 may include an actuator housing 310, a drive motor 320, an output shaft 330, and a connector pin 340.

The actuator housing 310 may accommodate the drive motor 320, the output shaft 330, and the connector pin 340. The actuator housing 310 may be directly or indirectly coupled to the handle housing 200.

The drive motor 320 may generate the driving force, for example, a rotational torque. The drive motor 320 may operate with electrical power supplied externally.

The output shaft 330 may be horizontally (e.g., axially) moved by the driving force of the drive motor 320 and may press the drive lever 400. The driving force of the drive motor 320 may act as a force for the horizontal movement of the output shaft 330, thus allowing the output shaft 330 to move horizontally. To this end, the drive motor 320 may be provided with a worm gear 321, and the output shaft 330 may be provided with a worm wheel 331. The worm gear 321 may be gear-coupled to the worm wheel 331. When the worm gear 321 rotates by the driving force of the drive motor 320, the worm wheel 331 may be rotated.

Further, the output shaft 330 may be screw-coupled to the worm wheel 331. When the worm wheel 331 rotates, the output shaft 330 may be moved horizontally with respect to the actuator housing 310 due to the screw-coupling that converts the rotational movement of the worm wheel 331 to a linear movement of the output shaft 330.

The connector pin 340 may supply the electrical power to the drive motor 320 or provide a path for a signal that represents a position of the output shaft 330 with respect to the actuator housing 310.

Referring to FIG. 11, the output shaft 330 may include a connection pin 332 configured to electrically connect a pair of connector pins among the connector pins 340. As the output shaft 330 moves with respect to the actuator housing 310, the connection pin 332 may electrically connect the pair of connector pins among the connector pins 340.

Referring to FIGS. 12 and 13, the connector pin 340 may include a first position electrode pin 341, a second position electrode pin 342, a common electrode pin 343, and power supply pins 344 and 345.

The power supply pins 344 and 345 may serve as terminals for supplying the electrical power to the drive motor 320. When power is supplied via the power supply pins 344 and 345, the drive motor 320 may generate the driving force to rotate the worm gear 321.

The worm gear 321 may rotate the worm wheel 331, and the worm wheel 331 may rotate in a state where its axial movement is restricted in the actuator housing 310. Accordingly, the worm wheel 331 may cause the output shaft 330 to move linearly with respect to the actuator housing 310.

The actuator 300 may include a position provision unit. The position provision unit may provide a position of the output shaft 330 relative to the actuator housing 310. For example, the position provision unit may provide whether the output shaft 330 is in a position that presses the drive lever 400 or not. The position of the output shaft 330 determined by the position provision unit may be provided to an electronic control unit (ECU) of the vehicle or a separate control means and be used for operation of the vehicle. Hereinafter, it will be mainly described that position information of the output shaft 330 is provided to the electronic control unit as an example.

The position provision unit may include the common electrode pin 343, the first position electrode pin 341, the second position electrode pin 342, and the connection pin 332. The common electrode pin 343 may be electrically connected to the first position electrode pin 341 or the second position electrode pin 342 to provide information associated with the position of the output shaft 330.

More specifically, when the first position electrode pin 341 is electrically connected to the common electrode pin 343, as shown in FIG. 12, it may indicate that the output shaft 330 is in the position that does not press the drive lever 400. Accordingly, the electronic control unit may determine that the output shaft 330 is in the position that does not press the drive lever 400. When the second position electrode pin 342 is electrically connected to the common electrode pin 343, as shown in FIG. 13, it may indicate that the output shaft 330 is in the position that presses the drive lever 400. Accordingly, the electronic control unit may determine that the output shaft 330 is in the position that presses the drive lever 400.

As described above, the output shaft 330 may include the connection pin 332. Through the connection pin 332, may the first position electrode pin 341 or the second electrode pin 342 be electrically connected to the common electrode pin 343. With the movement of the output shaft 330, the position of the connection pin 332 may be changed, thereby to alternatively connect the first position electrode pin 341 or the second position electrode pin 342 to the common electrode pin 343.

Figure 14:
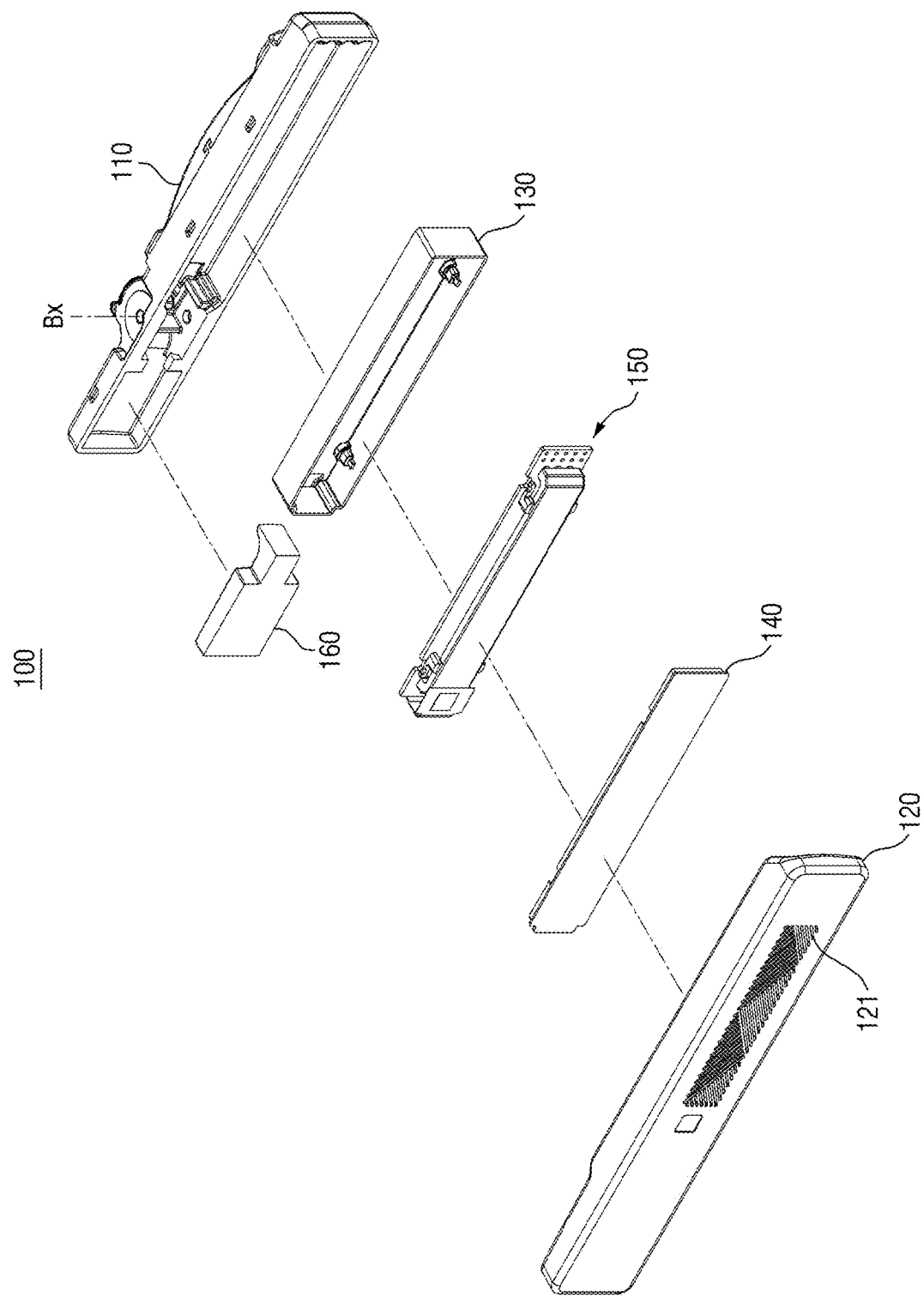
FIG. 14 is an exploded perspective view of the door handle.
Figure 15:
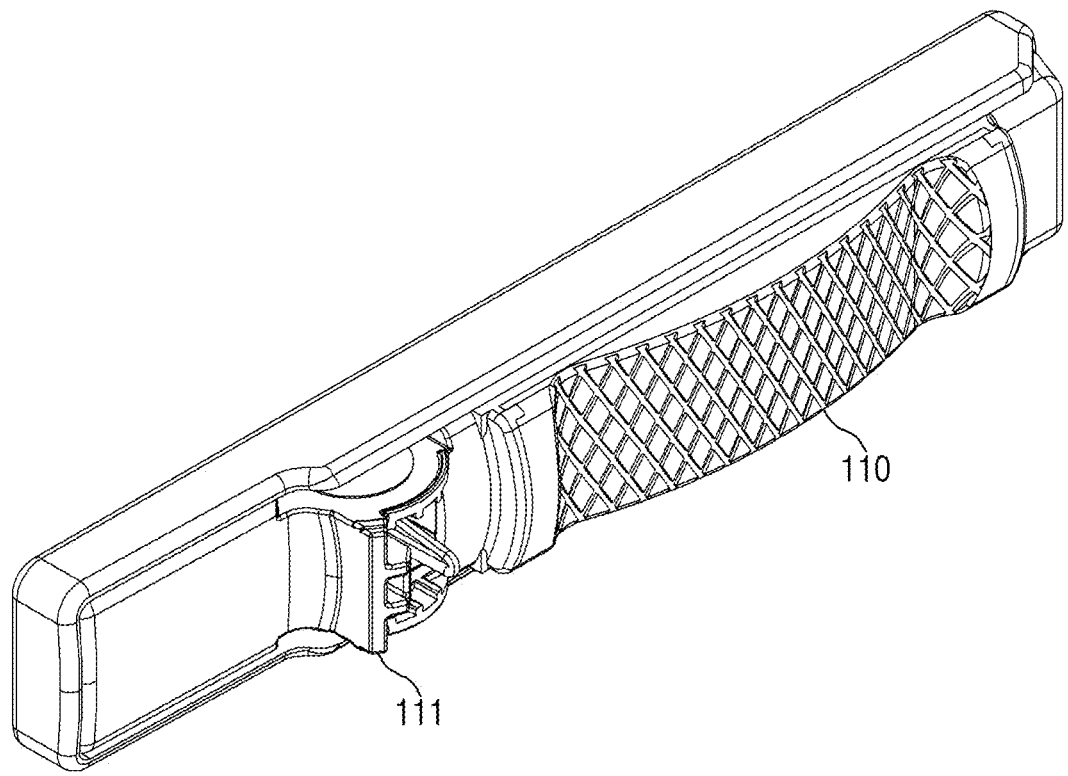
FIG. 15 is a perspective view of a handle body.

FIG. 14 is an exploded perspective view of the door handle, and FIG. 15 is a perspective view of the handle body. Referring to FIGS. 14 and 15, the door handle 100 may include a handle body 110, a handle cover 120, an optical housing 130, an optical cover 140, an optical device 150, and a weight body 160.

The handle body 110 may be coupled to the handle cover 120 to accommodate the optical housing 130, the optical cover 140, the optical device 150, and the weight body 160 therein. In addition, an assembly of the handle body 110 and the handle cover 120 may form an outer appearance of the door handle 100. The user may open the vehicle door 20 by grasping the assembly of the handle body 110 and the handle cover 120.

The handle cover 120 may be coupled to the handle body 110, thus providing accommodation spaces of the optical housing 130, the optical cover 140, the optical device 150, and the weight body 160. The handle cover 120 may include at least one light emission portion 121 (or light emission aperture) to emit light generated from the optical device 150. As described below, the optical device 150 may generate light. The light generated from the optical device 150 may be emitted to the exterior via the light emission portion 121 provided in the handle cover 120.

The light emission portion 121 may be formed over at least a part of the entire area of the handle cover 120 exposed to the exterior. FIG. 14 illustrates an example where the light emission portion 121 is formed in a part of one surface of the handle cover 120. However, the present disclosure is not limited thereto, and the light emission portion 121 may be formed across substantially the entire area of the handle cover 120.

The light emission portion 121 may be formed by perforating a surface of the handle cover 120 that is exposed to the exterior. The light emission portion 121 may remain a perforated state such that the inside and outside of the handle cover 120 are communicated or may be filled with a material that can transmit light.

The optical housing 130 and the optical cover 140 may accommodate the optical device 150 therein. The optical device 150 may be accommodated in the handle body 110 and the handle cover 120 in a state where it is accommodated in the optical housing 130 and the optical cover 140. The optical cover 140 may include a material that can transmit light. The light generated from the optical device 150 may be transmitted to the handle cover 120 by passing through the optical cover 140. Meanwhile, according to some embodiments of the present disclosure, the optical housing 130 and the optical cover 140 may be omitted, and the optical device 150 may be directly accommodated in the handle body 110 and the handle cover 120.

The optical device 150 may be configured to generate the light that correspond to signals received from the vehicle. In addition, the optical device 150 may receive a signal for the deployment of the door handle 100. The configuration and function of the optical device 150 will be described below with reference to FIGS. 22 to 26.

In some embodiments, the optical device 150 may be accommodated in one longitudinal side of the handle body 110. When the optical device 150, the optical housing 130, and the optical cover 140 are loaded on one longitudinal side of the handle body 110, a weight imbalance may occur in the door handle 100. In other words, the weight of the portion of the door handle 100 where the optical device 150, the optical housing 130, and the optical cover 140 are loaded may be greater than other portions. When the weight imbalance occurs in the door handle 100, noise may be generated by the door handle 100 during driving. In order to prevent or reduce the noise, the weight body 160 may be accommodated in the handle body 110. The handle body 110 may accommodate the optical device 150 on one side thereof and the weight body 160 on the other side thereof with respect to the rotation axis Bx of the drive lever 400. The weight body 160 may make the weight of both sides more uniform with respect to the rotation axis Bx of the drive lever 400. Specifically, the weight body 160 may reduce a mass moment of inertia of the door handle 100. As the weight body 160 reduces the moment of inertia of the door handle 100, the weight imbalance of the door handle 100, vibration of the door handle 100, as well as the noise caused by the door handle 100 during driving, may be prevented or reduced.

Referring to FIG. 15, a support protrusion 111 may be provided in the handle body 110. The support protrusion 111 may protrude from the handle body 110 and be supported by a support rod to be described below. As the support protrusion 111 is supported by the support rod, a force exerted by the user on the door handle 100 may be transmitted to the drive lever 400.

Figure 16:
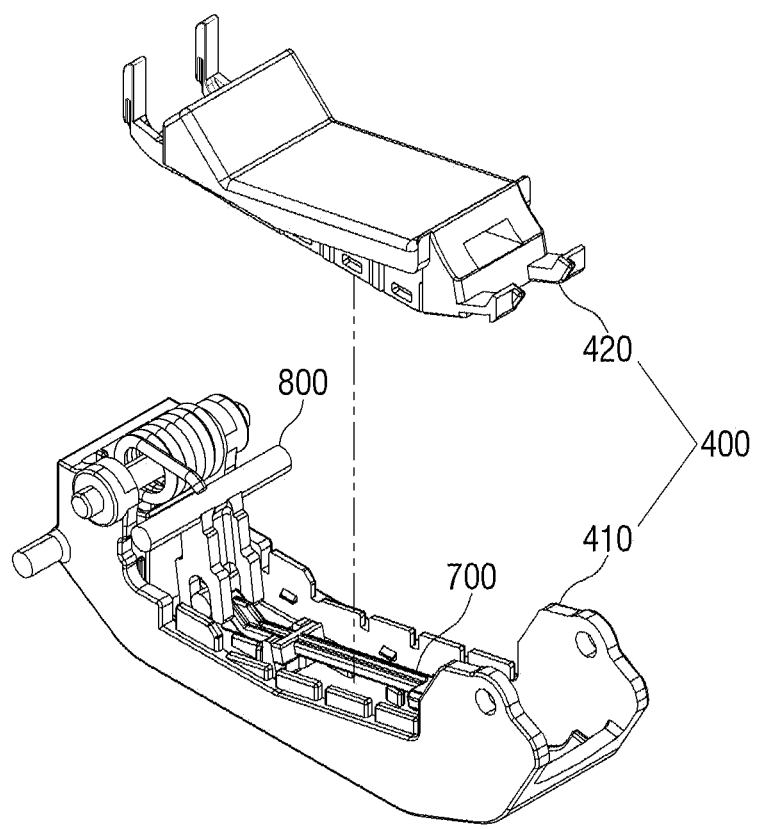
FIG. 16 is a perspective view of the drive lever.
Figure 17:
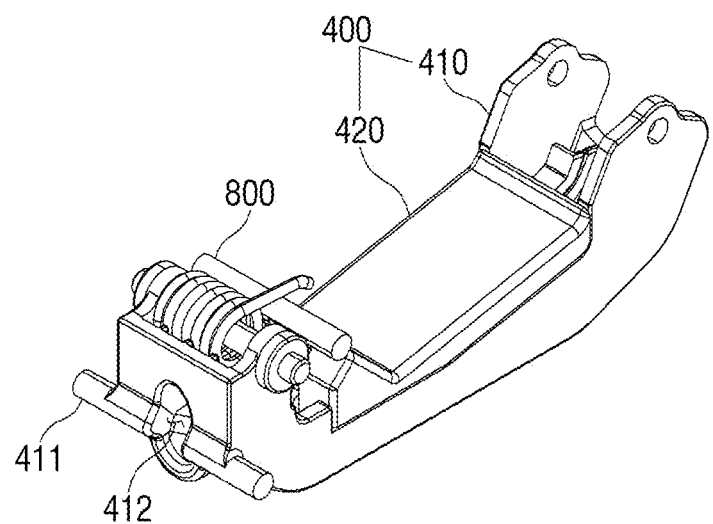
FIG. 17 is a rear perspective view of the drive lever.

FIG. 16 is a perspective view of the drive lever, and FIG. 17 is a rear perspective view of the drive lever. Referring to FIGS. 16 and 17, the drive lever 400 may include a lever body 410 and a lever cover 420. The lever body 410 and the lever cover 420 may be coupled to each other, thus providing accommodation spaces of the support rod 700 and the link 800.

A pressure delivery groove 412 may be formed in the lever body 410. The output shaft 330 provided in the actuator 300 may be inserted into the pressure delivery groove 412 to transmit the driving force of the actuator 300 to the drive lever 400. With the movement of the output shaft 330 with one end of the output shaft 330 being inserted into the pressure delivery groove 412, the drive lever 400 may rotate with respect to the handle housing 200.

The support rod 700 may horizontally move inside the drive lever 400. The support rod 700 may horizontally move with respect to the drive lever 400 to support an end of the door handle 100. Specifically, the support rod 700 may support the support protrusion 111 of the door handle 100. When the support protrusion 111 is supported by the support rod 700, the rotation of the door handle 100 with respect to the drive lever 400 may be prevented, and the force exerted on the door handle 100 may be transmitted to the drive lever 400.

A link 800 may be configured to move the support rod 700 while rotating with respect to the handle housing 200 by the rotation of the drive lever 400. A detailed description of the movement of the support rod 700 by the link 800 will be given below with reference to FIGS. 18 to 20.

Figure 18:
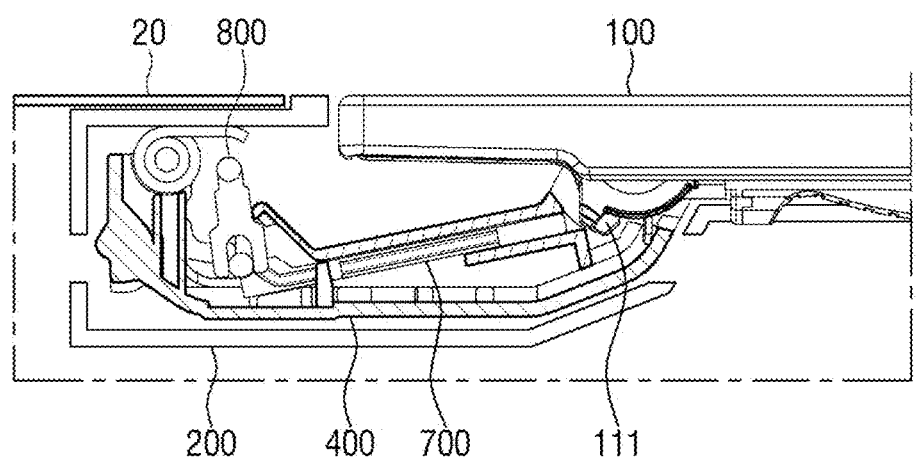
FIG. 18 illustrates positional relationship of the support rod for the drive lever when the door handle is accommodated in the handle housing.
Figure 19:
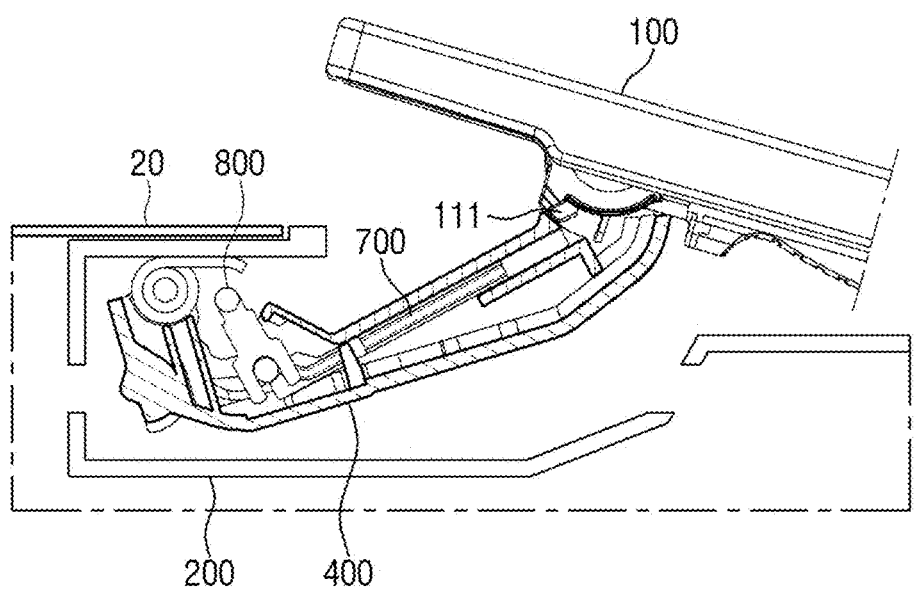
FIG. 19 illustrates positional relationship of the support rod for the drive lever when the door handle is deployed from the handle housing.
Figure 20:
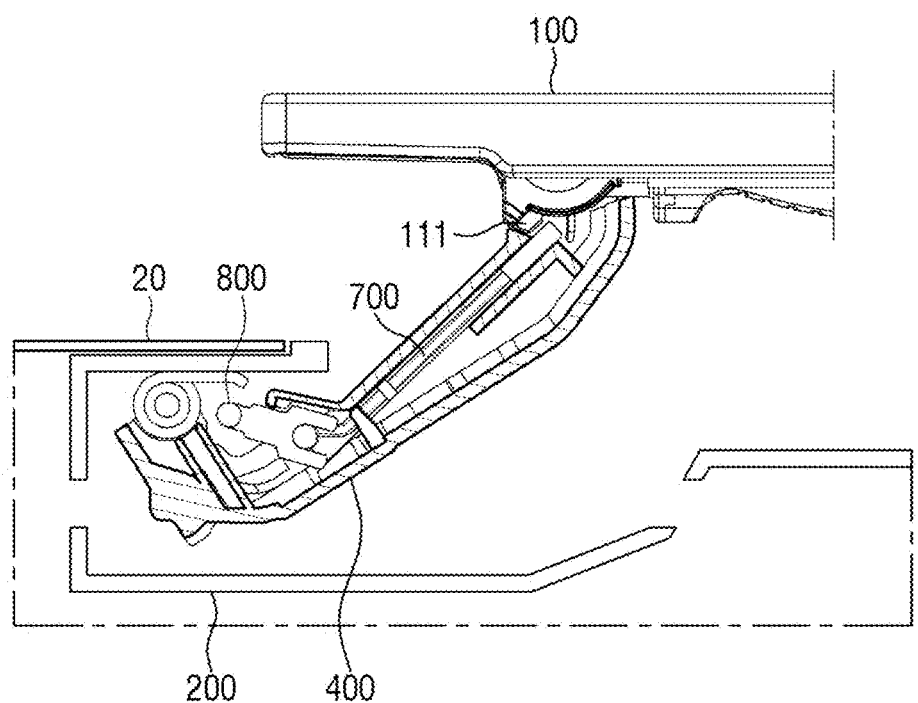
FIG. 20 illustrates the door handle supported by a support rod.

FIG. 18 illustrates a positional relationship between the support rod 700 and the drive lever 400 when the door handle 100 is accommodated in the handle housing 200, FIG. 19 illustrates the positional relationship between the support rod 700 and the drive lever 400 when the door handle 100 is deployed from the handle housing 200, and FIG. 20 illustrates the door handle 100 being supported by the support rod 700.

Referring to FIG. 18, when the door handle 100 is accommodated in the handle housing 200, the support rod 700 may remain unengaged with the support protrusion 111 of the door handle 100. Referring to FIG. 19, the link 800 may cause the support rod 700 to be moved with respect to the drive lever 400 as the drive lever begins to rotate with respect to the handle housing 200. More particularly, as the drive lever 400 rotates with respect to the handle housing 200 about the first rotational axis Ax, the link 800 may be rotated with respect to the handle housing 200 and may push the support rod 700 at the same time due to the linkage mechanism. Consequently, the support rod 700 may be moved horizontally and simultaneously brought proximate to the support protrusion 111 of the door handle 100. Referring to FIG. 20, the support rod 700 pushed by the link 800 may be engaged with and support the support protrusion 111 of the door handle 100.

The door handle 100 may be supported by the support rod 700 via the support protrusion 111. When the force is exerted on the door handle 100 in a direction opposite to the direction of the handle housing 200 while the door handle 100 is supported by the support rod 700, the rotation of the door handle 100 with respect to the drive lever 400 may be prevented such that the force acting on the door handle 100 may be transmitted to the drive lever 400. As such, when the door handle 100 is deployed from the handle housing 200, the user may pull the door handle 100 to open the vehicle door 20. In such case, since the support protrusion 111 is supported by the support rod 700, the rotation of the door handle 100 with respect to the drive lever 400 may be prevented, and the user's force exerted on the door handle 100 may be transmitted to the drive lever 400.

When the drive lever 400 is rotated by the force transmitted from the door handle 100, the unlocking pin 411 of the drive lever 400 may press the unlocking unit 500, which may, in turn, unlock the vehicle door 20.

When the driving force of the actuator 300 is removed, the support rod 700 may be returned to its original position by the link 800, and the support of the support protrusion 111 by the support rod 700 may be released. In such case, the door handle 100 may be allowed to rotate with respect to the drive lever 400, and the door handle 100 may be accommodated in the handle housing 200.

Figure 21:
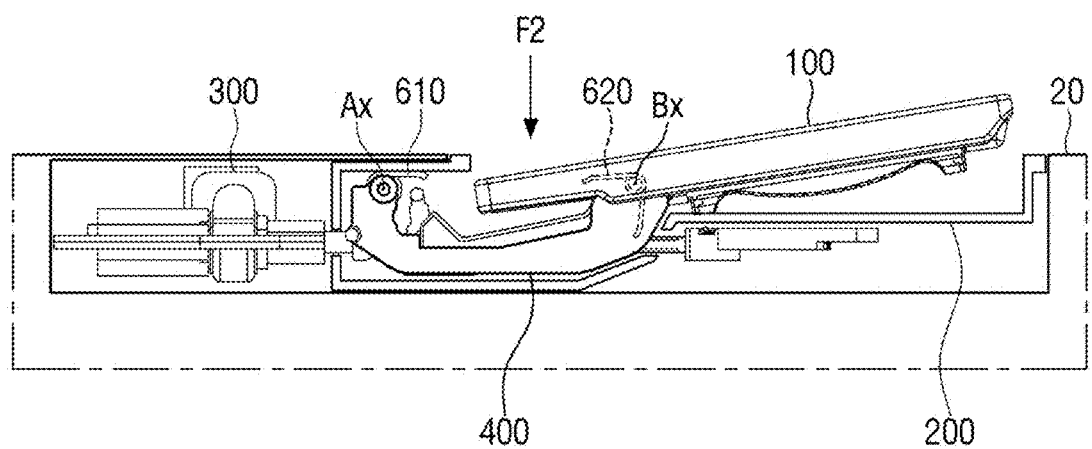
FIG. 21 illustrates a part of the door handle being deployed from the handle housing by an external force.

FIG. 21 illustrates a part of the door handle being deployed from the handle housing by an external force. Referring to FIG. 21, a part of the door handle 100 may be deployed from the handle housing 200 by an external force F2. When the force F2 is exerted on one side of the door handle 100, a part of the door handle 100 may be deployed from the housing since the door handle 100 is rotated with respect to the drive lever 400. For instance, when the pressing force F2 is exerted on the part of the door handle 100 that accommodates the weight body 160 therein, the door handle 100 may be rotated with respect to the drive lever 400, and a part of the door handle 100 that accommodates the optical device 150 may be simultaneously exposed to the exterior of the handle housing 200. Such a behavior may provide a back-up means to operate the door handle 100.

For example, when a signal receiver 154 (which will be described below with reference to FIG. 22) or the actuator 300 does not function normally, the door handle 100 may not be deployed by the driving force of the actuator 300. In such case, the user may press one side of the door handle 100 such that the other side thereof may be partially exposed to the exterior of the handle housing 200. Subsequently, the user may open the vehicle door 20 by grasping and pulling the door handle 100 exposed to the exterior. When the vehicle door 20 is opened and the user's force pulling the door handle 100 is released, the door handle 100 may be accommodated in the handle housing 200 again and converted into an accommodation state by the elastic force of the first elastic member 610.

Figure 22:
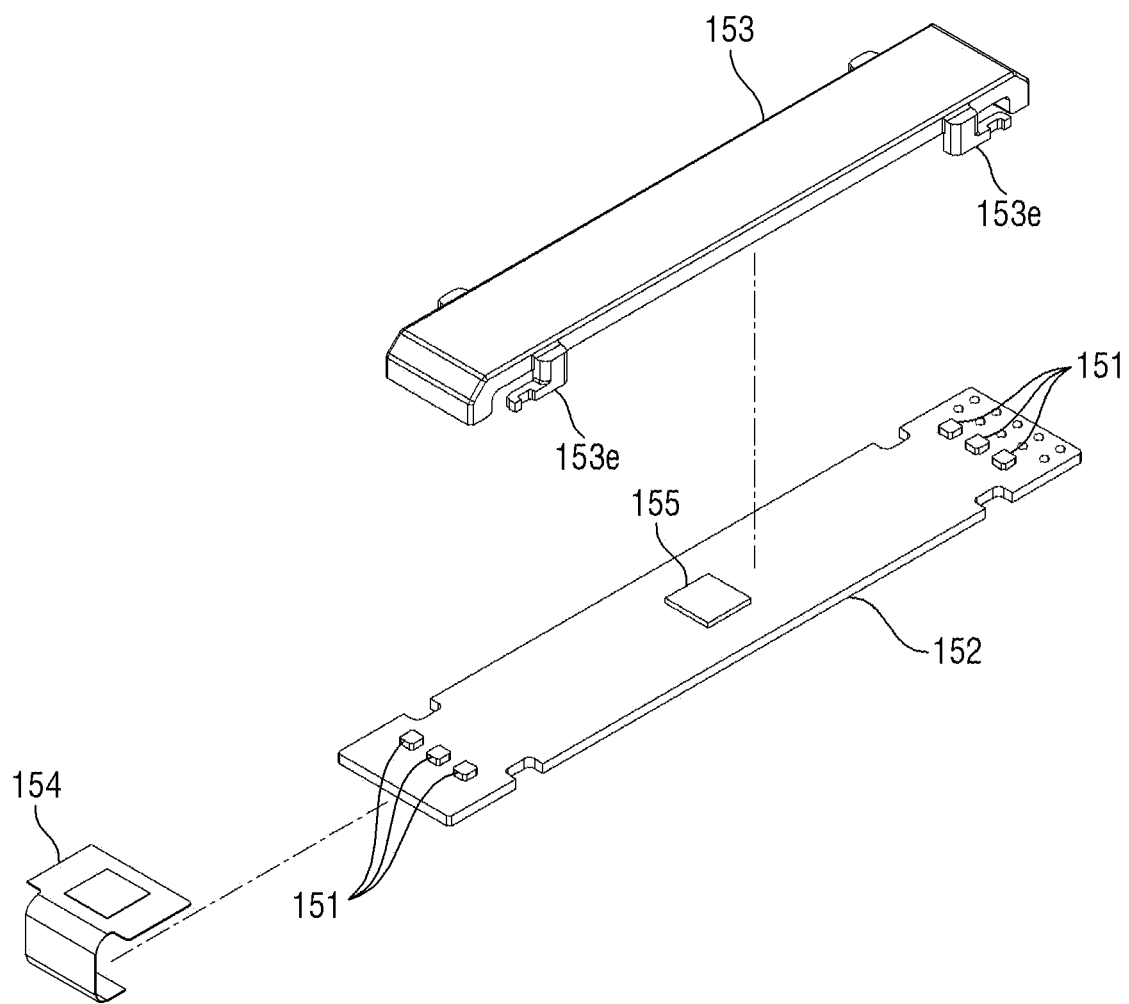
FIG. 22 is an exploded perspective view of an optical device.
Figure 23:
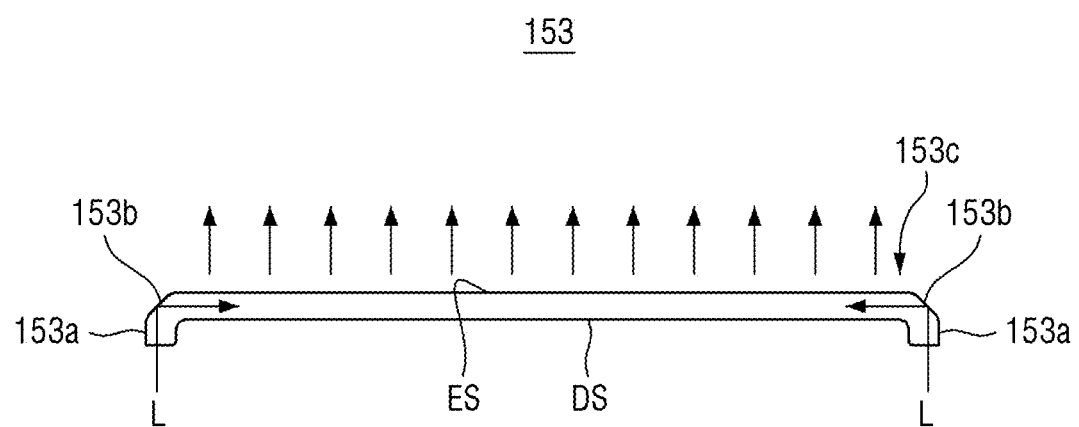
FIG. 23 depicts the function of an optical guide.
Figure 24:
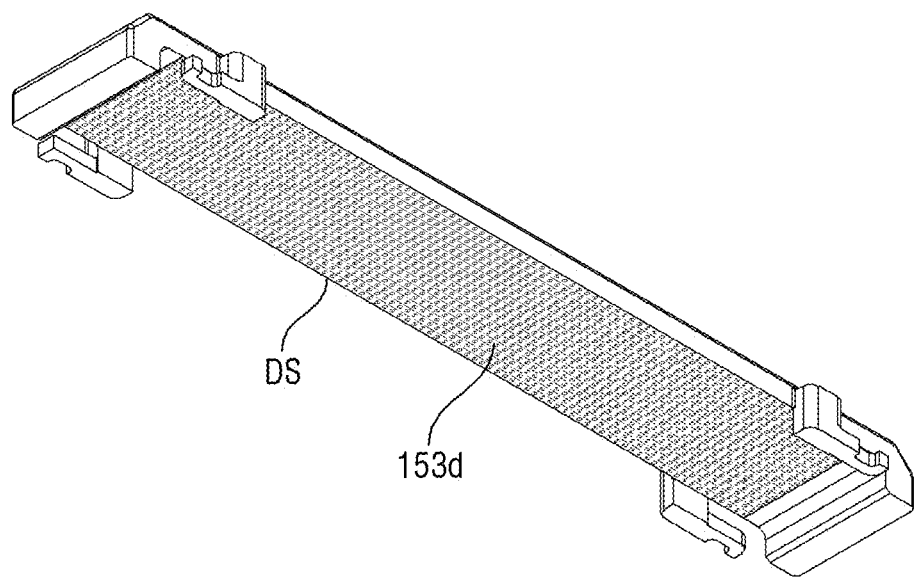
FIG. 24 is a bottom perspective view of the optical guide.
Figure 25:
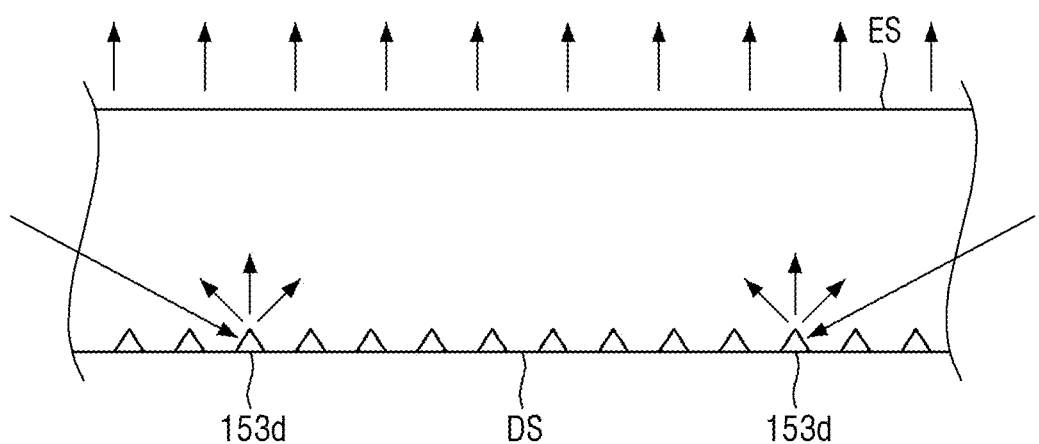
FIG. 25 depicts the function of a light diffusion part.
Figure 26:
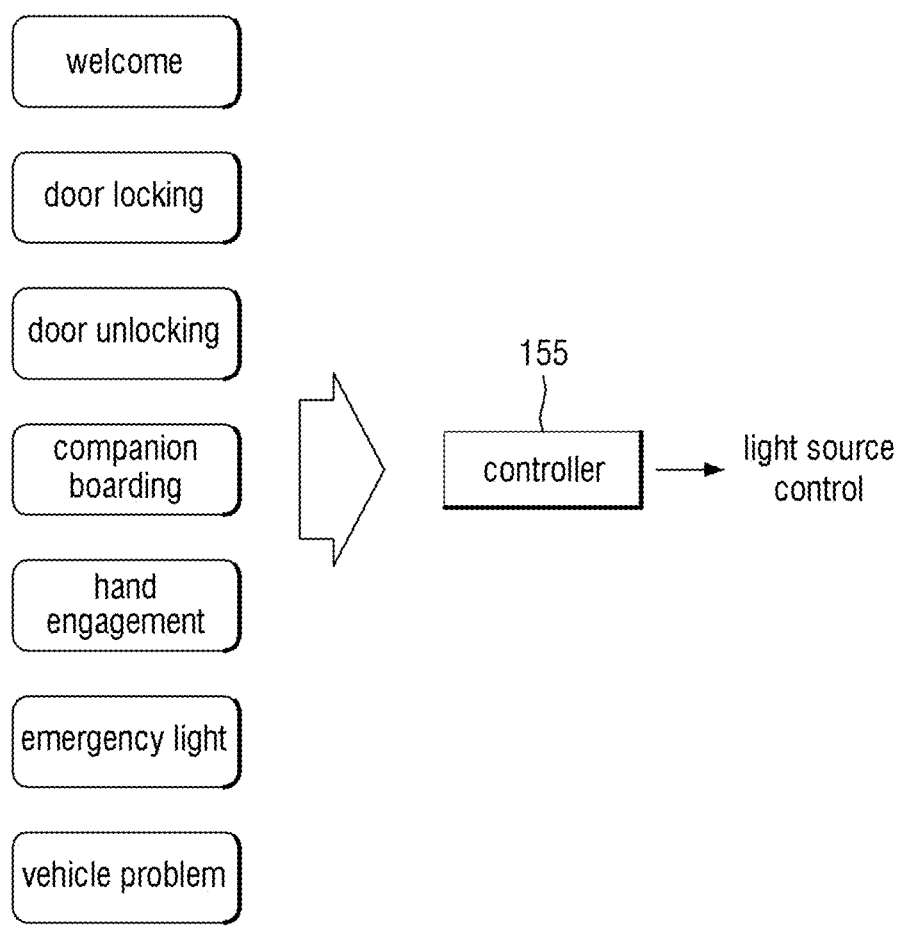
FIG. 26 depicts the function of a controller.
Figure 27:
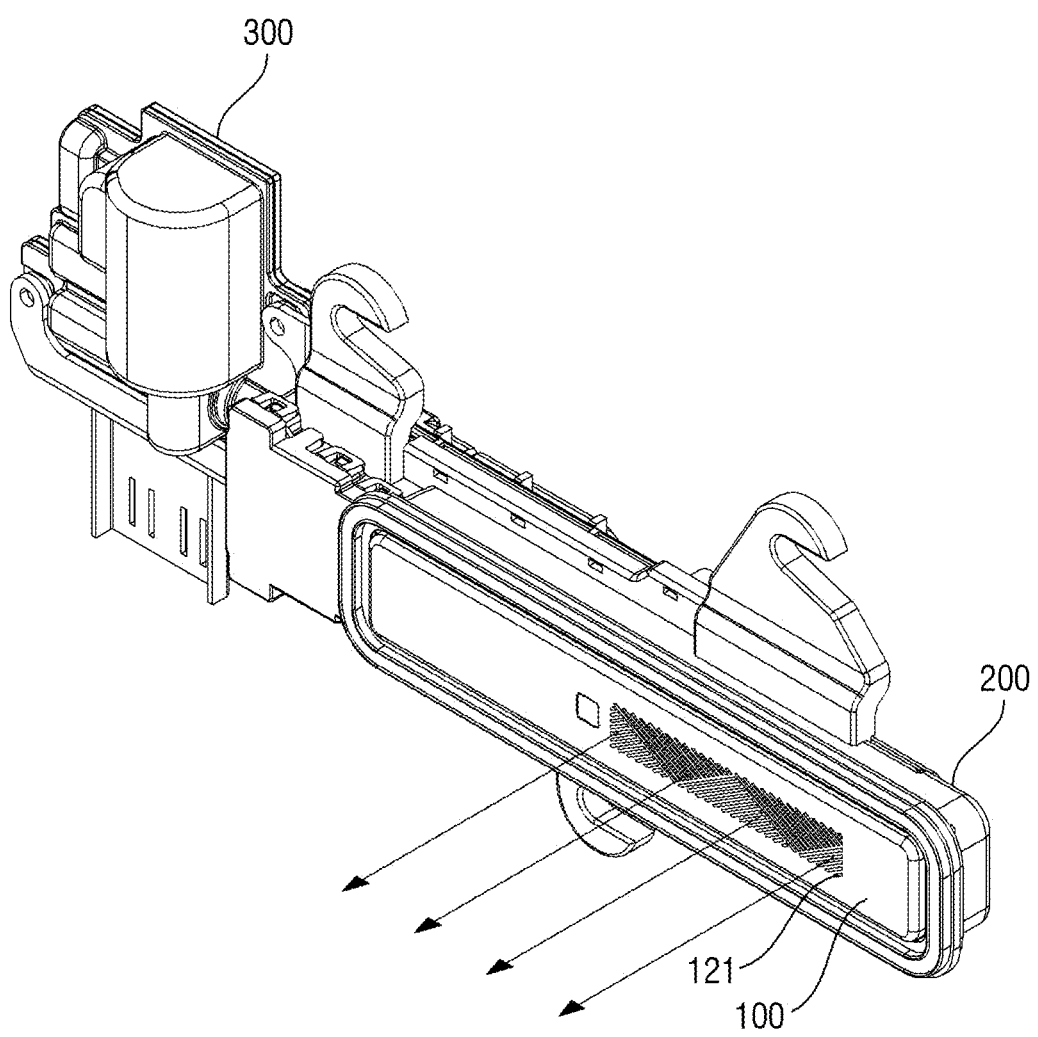
FIG. 27 depicts light being emitted from a door handle assembly for a vehicle according to an embodiment of the present disclosure.

FIG. 22 is an exploded perspective view of the optical device, FIG. 23 depicts the function of an optical guide, FIG. 24 is a bottom perspective view of the optical guide, FIG. 25 depicts the function of a light diffusion part, FIG. 26 depicts the function of a controller, and FIG. 27 depicts light being emitted from a vehicle door handle assembly.

Referring to FIG. 22, the optical device 150 may include a light source 151, a substrate 152, an optical guide 153, a signal receiver 154, and a controller 155. The light source 151 may irradiate light. For instance, the light source 151 may be provided in the form of a light emitting diode (LED). The substrate 152 may support the light source 151. In the present disclosure, a plurality of light sources 151 may be provided. The plurality of light sources 151 may irradiate light with colors different from one another. Alternatively, each of the plurality of light sources 151 may be capable of irradiating light in different colors. The light guide 153 may guide the light irradiated from the light source 151 and emit the light to the handle cover 120.

Referring to FIG. 23, the light guide 153 may include a light incident part 153a, a light reflection part 153b, and a light emission part 153c. The light incident part 153a may receive light L from the light source 151. To this end, the light incident part 153a may be disposed adjacent to the light source 151. The light reflection part 153b may reflect the light L incident on the light incident part 153a to the light emission part 153c. In the present disclosure, the light emission part 153c may be formed in an elongated shape, and the light reflection part 153b may irradiate the reflected light along the longitudinal direction of the light emission part 153c.

The light emission part 153c may emit the light L incident on the light incident part 153a. Specifically, the light emission part 153c may emit the light L reflected by the light reflection part 153b. The light emission part 153c may include a light emission surface ES and a light diffusion surface DS. The light emission surface ES may be disposed towards the handle cover 120, and may emit the light incident on the light incident part 153a to the handle cover 120. The light emission part 153c may perform surface emission of the light in a shape corresponding to the shape of the light emission surface ES.

The light diffusion surface DS may be provided on the opposite side of the light emission surface ES and may diffuse the light L incident on the light incident part 153a towards the light emission surface ES. Referring to FIGS. 24 and 25, the light diffusion surface DS may include at least one light diffusion part 153d configured to diffuse the incident light L. The light diffusion part 153d may be formed by recessing the light diffusion surface DS inwards in a conical shape. In some embodiments, the light diffusion part 153d may be formed in a hemisphere shape. The light diffusion part 153d may be formed over at least a portion of the light diffusion surface DS. FIG. 24 illustrates an example where the light diffusion part 153d is formed over the entire area of the light diffusion surface DS.

As illustrated in FIG. 25, the light diffusion part 153d may diffuse the incident light L and irradiate it to the light emission surface ES. As the light diffused by the light diffusion part 153d is emitted through the light emission surface ES, the light emission part 153c may perform surface emission of the light corresponding to the shape of the light emission surface ES.

Referring back to FIG. 22, the light guide 153 may include a leg 153e. The leg 153e may be coupled to the optical housing 130. For instance, the leg 153e may be coupled to the optical housing 130 by a coupling means such as a screw. Since the leg 153e is coupled to the optical housing 130, the light guide 153 may be fixed to the optical housing 130.

The signal receiver 154 may receive a signal associated with the deployment of the door handle 100. For example, the signal may be received using short-range wireless communication such as radio-frequency identification (RFID) or near field communication (NFC). The user may bring the communication means with an RFID tag or an NFC tag attached thereto proximate to the optical device 150. When the communication means is brought proximate to the optical device 150, the signal receiver 154 of the optical device 150 may receive the signal associated with the deployment of the door handle 100 from the communication means.

Referring to FIGS. 22 and 26, the controller 155 may be configured to control an operation of the light source 151. For example, the controller 155 may be configured to control the light source 151 to irradiate light of a particular color or pattern depending on the signal received from the vehicle. For example, when a first vehicle signal is received, the controller 155 may be configured to control the light source 151 to irradiate red light. Accordingly, a light source 151 that irradiates the red light may be turned on under the control of the controller 155. Alternatively, when a second vehicle signal is received, the controller 155 may be configured to control the light source 151 to produce blinking blue light. Accordingly, the light source 151 that irradiates the blue light may blink under the control of the controller 155.

The vehicle signal may include a welcome signal, a door locking signal, a door unlocking signal, a companion boarding signal, a hand engagement signal, an emergency light signal, a vehicle problem signal, or the like. The controller 155 may be configured to control the light source 151 to irradiate the light in a color or pattern corresponding to the vehicle signal.

FIG. 27 illustrates the light being emitted from the vehicle door handle assembly. As the optical device 150 generates the light, the light may be emitted through the light emission portion 121 formed in the handle cover 120 of the door handle 100. The user may recognize the status of the vehicle by referring to the light emitted through the door handle 100. For instance, the user may also check whether the vehicle door 20 has been changed to a locked or unlocked state by referring to the light emitted through the door handle 100. Alternatively, by referring to the light emitted through the door handle 100, the user may check whether a companion has embarked the vehicle or whether any problem has occurred in the vehicle.

Figure 28:
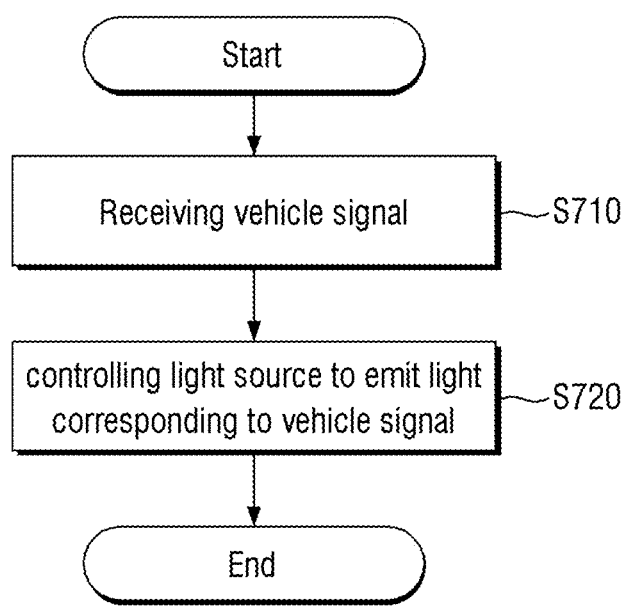
FIG. 28 is a flowchart illustrating a method of controlling a door handle assembly for a vehicle according to an embodiment of the present disclosure.

FIG. 28 is a flowchart illustrating a method of controlling a door handle assembly for a vehicle according to embodiments of the present disclosure. Referring to FIG. 28, the controller 155 may be configured to receive the vehicle signal from the vehicle (S710) and control the light source 151 provided in the door handle 100 so that the light color and/or pattern that corresponds to the vehicle signal may be emitted from the door handle 100 (S720).

In the present disclosure, the vehicle signal may include a welcome signal, a door locking signal, a door unlocking signal, a companion boarding signal, a hand engagement signal, an emergency light signal, a vehicle problem signal, or the like, such that the user may be able to check the status of the vehicle by referring to the light emitted from the door handle 100.

Although the embodiments of the present disclosure have been described with reference to the above and the accompanying drawings, those of ordinary skill in the art, to which the present disclosure pertains, can understand that the present disclosure may be implemented in other forms without changing the technical spirit or essential features. Therefore, it should be understood that the embodiments described above are illustrative and non-limiting in any respects.

What is claimed is:

1. A door handle assembly for a vehicle, comprising:
a door handle;
a handle housing configured to provide an accommodation space for the door handle;
a drive lever rotatably coupled to the handle housing and rotatably coupled to the door handle;
an actuator configured to transmit a driving force to the drive lever to deploy the door handle from the handle housing;
a support rod configured to move horizontally with respect to the drive lever and support an end of the door handle; and
a link configured to move the support rod while rotating with respect to the handle housing by the rotation of the drive lever,
wherein the door handle is deployed from the handle housing as the drive lever is rotated with respect to the handle housing by the driving force of the actuator, and the door handle is rotated with respect to the drive lever.

2. The door handle assembly of claim 1, wherein when the door handle is accommodated in the handle housing, the door handle is disposed parallel to a vehicle door, and
wherein during deployment by the driving force of the actuator, the door handle becomes inclined with respect to the vehicle door, and upon completion of the deployment, the door handle is disposed parallel to the vehicle door.

3. The door handle assembly of claim 1, wherein as the door handle is disposed inclined with respect to a vehicle door, a part of the door handle is discharged to exterior of the handle housing.

4. The door handle assembly of claim 1, further comprising:
a first elastic member configured to generate an elastic force between the handle housing and the drive lever; and
a second elastic member configured to generate an elastic force between the drive lever and the door handle,
wherein in response to the driving force of the actuator being removed, the door handle is accommodated in the handle housing by the elastic force of the first elastic member, and
wherein in response to the drive lever being rotated by the driving force of the actuator, the door handle may be rotated with respect to the drive lever by the elastic force of the second elastic member.

5. The door handle assembly of claim 1, wherein a vehicle door is unlocked in response to a force being exerted on the door handle in a direction away from the handle housing in a state where the door handle is deployed from the handle housing.

6. The door handle assembly of claim 5, further comprising:
an unlocking unit connected to the drive lever and configured to unlock the vehicle door based on the rotation of the drive lever.

7. The door handle assembly of claim 1, wherein in response to a force being exerted on the door handle in a direction away from the handle housing in a state where the door handle is supported by the support rod, the door handle is prevented from rotating with respect to the driving lever, and the force to the door handle is transmitted to the drive lever.

8. The door handle assembly of claim 1, wherein in response to a force being exerted on one side of the door handle, a part of the door handle is deployed from the handle housing as the door handle is rotated with respect to the drive lever.

9. The door handle assembly of claim 1, A door handle assembly for a vehicle, comprising:
a door handle;
a handle housing configured to provide an accommodation space for the door handle;
a drive lever rotatably coupled to the handle housing and rotatably coupled to the door handle; and
an actuator configured to transmit a driving force to the drive lever to deploy the door handle from the handle housing,
wherein the door handle is deployed from the handle housing as the drive lever is rotated with respect to the handle housing by the driving force of the actuator, and the door handle is rotated with respect to the drive lever, and
wherein the actuator comprises:
a drive motor configured to generate the driving force by rotation;
an output shaft configured to move axially by the driving force and press the drive lever;
an actuator housing configured to accommodate the drive motor and the output shaft; and
a position provision unit configured to provide a position of the output shaft with respect to the actuator housing.

10. The door handle assembly of claim 9, wherein the position provision unit comprises:
a common electrode pin;
a first position electrode pin configured to indicate that the output shaft is in a position that does not press the drive lever in response to the first position electrode pin being electrically connected to the common electrode pin;
a second position electrode pin configured to indicate that the output shaft is in a position that presses the driving lever in response to the second position electrode pin being electrically connected to the common electrode pin; and
a connection pin included in the output shaft and configured to connect the first position electrode pin or the second position electrode pin to the common electrode pin.

11. A door handle assembly for a vehicle, comprising:
a door handle;
a handle housing configured to provide an accommodation space for the door handle;
a drive lever rotatably coupled to the handle housing and rotatably coupled to the door handle; and an actuator configured to transmit a driving force to the drive lever to deploy the door handle from the handle housing, wherein the door handle is deployed from the handle housing as the drive lever is rotated with respect to the handle housing by the driving force of the actuator, and the door handle is rotated with respect to the drive lever, and wherein the door handle comprises:
- a signal receiver configured to receive a signal associated with deployment of the door handle;
- a weight body; and
- a handle body configured to accommodate the signal receiver on one side thereof and the weight body on the other side thereof with respect to a rotation axis of the drive lever.

12. The door handle assembly of claim 11, wherein the weight body decreases a moment of inertia of the door handle with respect to the rotation axis.

13. A door handle assembly for a vehicle, comprising:
a door handle;
a handle housing configured to provide an accommodation space for the door handle;
a drive lever rotatably coupled to the handle housing and rotatably coupled to the door handle; and
an actuator configured to transmit a driving force to the drive lever to deploy the door handle from the handle housing, wherein the door handle is deployed from the handle housing as the drive lever is rotated with respect to the handle housing by the driving force of the actuator, and the door handle is rotated with respect to the drive lever, wherein the door handle includes an optical device configured to emit light that corresponds to a vehicle signal received from the vehicle, wherein the optical device comprises:
- a light source configured to irradiate the light;
- a light guide configured to guide the light irradiated from the light source and emit the light to the handle cover;
- a substrate configured to support the light source; and
- a controller configured to control an operation of the light source, wherein the light guide comprises:
- a light incident part configured to receive the light from the light source, and
- a light emission part configured to emit the light incident on the light incident part, and wherein the light emission part comprises:
- a light emission surface disposed towards the handle cover and configured to emit the light incident on the light incident part to the handle cover; and
- a light diffusion surface provided on an opposite side of the light emission surface and configured to diffuse the light incident on the light incident part to the light emission surface.

14. The door handle assembly of claim 13, wherein a vehicle door is unlocked in response to a force being exerted on the door handle in a direction away from the handle housing in a state where the door handle is deployed from the handle housing.

15. The door handle assembly of claim 13, wherein the door handle further comprises:
- a handle body configured to accommodate the optical device; and
- a handle cover coupled to the handle body and configured to provide an accommodation space for the optical device, wherein the handle cover includes at least one light emission portion to emit the light generated from the optical device.

16. The door handle assembly of claim 13, wherein the light diffusion surface includes at least one light diffusion part formed by recessing the light diffusion surface inwards.

17. The door handle assembly of claim 13, wherein the controller is configured to control the light source to irradiate the light of a particular color or pattern depending on the vehicle signal received from the vehicle.

18. A door handle assembly for a vehicle, comprising:
a door handle;
a handle housing configured to provide an accommodation space for the door handle;
a drive lever rotatably coupled to the handle housing and rotatably coupled to the door handle; and
an actuator configured to transmit a driving force to the drive lever to deploy the door handle from the handle housing, wherein the door handle is deployed from the handle housing as the drive lever is rotated with respect to the handle housing by the driving force of the actuator, and the door handle is rotated with respect to the drive lever, wherein when the door handle is accommodated in the handle housing, the door handle is disposed parallel to a vehicle door, and wherein during deployment by the driving force of the actuator, the door handle becomes inclined with respect to the vehicle door, and upon completion of the deployment, the door handle is disposed outside of the handle housing and parallel to the vehicle door.

* * * * *